(12) United States Patent
Gopalakrishnan

(10) Patent No.: US 8,108,776 B2
(45) Date of Patent: Jan. 31, 2012

(54) USER INTERFACE FOR MULTIMODAL INFORMATION SYSTEM

(75) Inventor: Kumar C. Gopalakrishnan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 11/423,257

(22) Filed: Jun. 9, 2006

(65) Prior Publication Data

US 2006/0218193 A1 Sep. 28, 2006

Related U.S. Application Data

(63) Continuation-in-part of application No. 11/215,601, filed on Aug. 30, 2005.

(60) Provisional application No. 60/689,345, filed on Jun. 10, 2005, provisional application No. 60/689,613, filed on Jun. 10, 2005, provisional application No. 60/689,618, filed on Jun. 10, 2005, provisional application No. 60/689,741, filed on Jun. 10, 2005, provisional application No. 60/689,743, filed on Jun. 10, 2005, provisional application No. 60/606,282, filed on Aug. 31, 2004.

(51) Int. Cl.
*G06F 3/00* (2006.01)
*G06F 3/048* (2006.01)
*G06F 17/00* (2006.01)
*G06F 7/00* (2006.01)

(52) U.S. Cl. ........ 715/719; 715/764; 715/777; 715/230; 707/705; 707/758

(58) Field of Classification Search .......... 715/764, 715/733, 716, 719, 777, 230; 707/104.1, 707/1, 705, 758
See application file for complete search history.

(56) References Cited

U.S. PATENT DOCUMENTS

| | | | | |
|---|---|---|---|---|
| 5,966,122 A * | 10/1999 | Itoh | ................ | 715/838 |
| 6,614,930 B1 * | 9/2003 | Agnihotri et al. | ............. | 382/176 |
| 7,124,366 B2 * | 10/2006 | Foreman et al. | ............. | 715/719 |
| 7,325,199 B1 * | 1/2008 | Reid | ............. | 715/723 |
| 2001/0056396 A1 * | 12/2001 | Goino | ............. | 705/37 |
| 2002/0026329 A1 * | 2/2002 | Saito et al. | ............. | 705/3 |
| 2002/0040358 A1 * | 4/2002 | Ikezawa et al. | ............. | 707/1 |
| 2002/0062248 A1 * | 5/2002 | Sakurai | ............. | 705/14 |
| 2003/0028380 A1 * | 2/2003 | Freeland et al. | ............. | 704/260 |
| 2004/0049734 A1 * | 3/2004 | Simske | ............. | 715/512 |
| 2004/0054294 A1 * | 3/2004 | Ramseth | ............. | 600/509 |
| 2004/0107439 A1 * | 6/2004 | Hassell et al. | ............. | 725/44 |
| 2004/0148186 A1 * | 7/2004 | Kawashima et al. | ............. | 705/1 |
| 2005/0177420 A1 * | 8/2005 | Tanahashi | ............. | 705/14 |
| 2005/0177859 A1 * | 8/2005 | Valentino et al. | ............. | 725/105 |
| 2007/0238441 A1 * | 10/2007 | Eldon et al. | ............. | 455/348 |

* cited by examiner

*Primary Examiner* — Ting Lee

(74) *Attorney, Agent, or Firm* — Blakely, Sokoloff, Taylor & Zafman LLP

(57) ABSTRACT

A method and system for providing a user interface for information services related to multimodal information on a computer system is presented. A system for providing a user interface for augmenting multimodal information with information services and interacting with the information services is described.

16 Claims, 20 Drawing Sheets

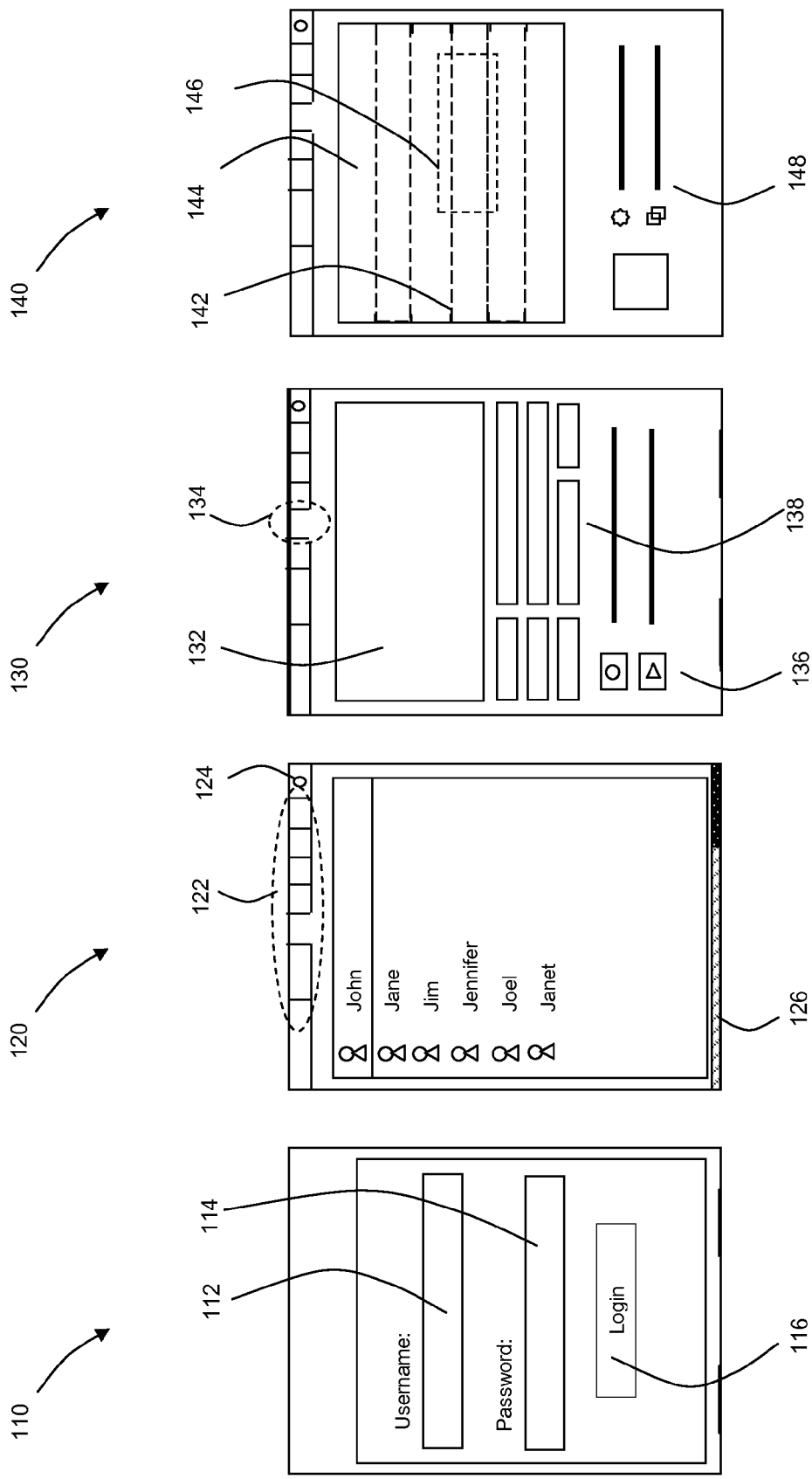

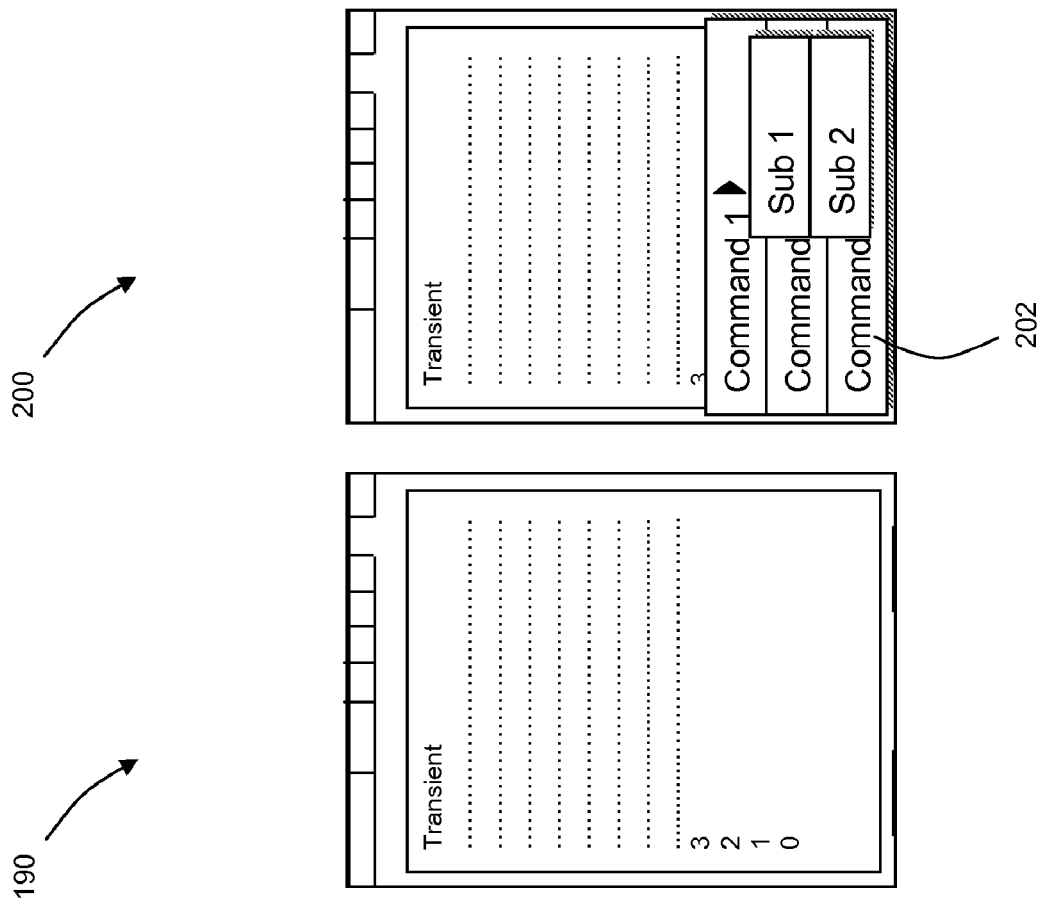

USER INTERFACE FOR MULTIMODAL INFORMATION SYSTEM

CROSS-REFERENCE TO RELATED APPLICATIONS

This application claims the benefit of U.S. provisional patent application 60/689,345, 60/689,613, 60/689,618, 60/689,741, and 60/689,743, all filed Jun. 10, 2005, and is a continuation in part of U.S. patent application Ser. No. 11/215,601, filed Aug. 30, 2005, which claims the benefit of U.S. provisional patent application 60/606,282, filed Aug. 31, 2004. These applications are incorporated by reference along with any references cited in this application.

BACKGROUND OF THE INVENTION

The present invention relates to presenting information services on a computer system. Specifically, it relates to the presentation of information services related to multimodal information.

Systems for presenting information on a computer system commonly referred to as the computer user interface have been developed for various computer systems and computer usage scenarios. User interfaces are usually customized to the computer system under consideration and the use for which it is intended. For instance, a desktop personal computer has a windowing software user interface for intuitive use of multiple applications simultaneously while the individual software applications have their own user interfaces designed for the intended usage of the application.

Presenting a multimodal multimedia user interface on with restricted capabilities presents unique challenges. An application such as accessing information services relevant to multimodal information that hitherto has not been available, places additional requirements on designing a user interface for it. In view of the foregoing, a user interface for such an application that uniquely addresses the constraints of presenting information services related to multimodal information and still provides a versatile functionality is desirable.

BRIEF SUMMARY OF THE INVENTION

A user interface for a multimodal information system that provides information services and multimedia documents related to multimodal information is presented. The user interface enables users to retrieve, present, author, communicate, store and interact with the information services and multimedia documents provided by the multimodal information system. The user interface is comprised of views designed to address various functionality required for using the multimodal information system. The operation of the views comprising the user interface including user inputs and the user interface responses are also described. The user interface also enables the presentation of an augmented version of multimodal input information.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 1(a) illustrates an exemplary embodiment of a login view.

FIG. 1(b) illustrates an exemplary embodiment of a management view.

FIG. 1(c) illustrates an exemplary embodiment of a authoring view.

FIG. 1(d) illustrates an exemplary embodiment of a capture view.

FIG. 1(i) illustrates an exemplary embodiment of a transient view.

FIG. 1(j) illustrates an exemplary embodiment of a view integrating a menu.

DETAILED DESCRIPTION OF THE INVENTION

Figure 1H:
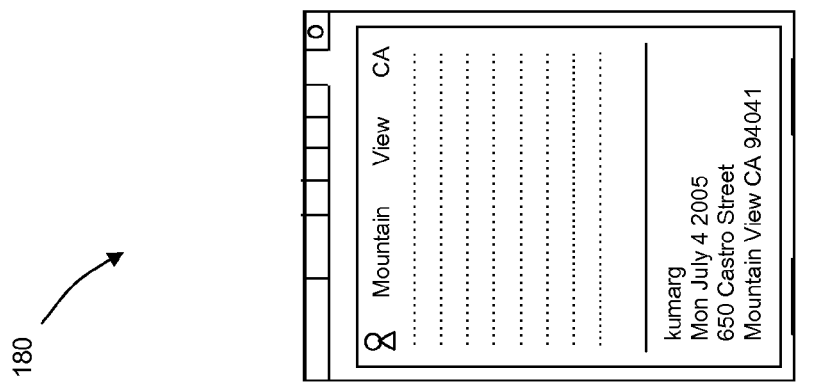
FIG. 1(h) illustrates an alternate embodiment of a content view.

A system and method are described for a computer information presentation system. The specific embodiments described in this description represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art, that the invention can be practiced without these specific details. In other instances, structures and devices are shown in block diagram form in order to avoid obscuring the invention.

Reference in the specification to "one embodiment" or "an embodiment" or "some embodiments" means that a particular feature, structure, or characteristic described in connection with the embodiment is included in at least one embodiment of the invention. The appearances of the phrase "in one embodiment" or "in some embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

An embodiment presents a computer information presentation system or user interface that addresses the unique characteristics of presenting a multimodal multimedia user experience on computer systems, including computer systems with restricted capabilities. The restricted capabilities of the computer systems may derive from factors such as restricted physical size and limited input and output features. Examples of computer systems with restricted capabilities include cellular phones, camera phones, personal digital assistants (PDAs), handheld computers and television remote controls. The multimedia user experience presented may include both information services and multimedia documents.

In the scope of this description the term "system" is used to refer to a system for providing information services related to multimodal information. The term "information service" is used to refer to a user experience provided by the system that may include (1) the logic to present the user experience, (2) multimedia content, and (3) related user interfaces. The term "content" is used to refer to multimedia data used in the information services. The term "client device" refers to a computer system that incorporates the user interface. The term "visual imagery" refers to multimedia content in the form of a single still image, a plurality of still images, a single video sequence, a plurality of video sequences, or a combination thereof.

The user interface presented here may constitute the user interface of a computer system in its entirety or form one component of the computer system's user interface. In the latter case, the user interface presented here may form the user interface of a specific application or module installed in the computer system. The user interface and its logic may be implemented in software, firmware, hardware or a combination thereof.

Figure 1G:
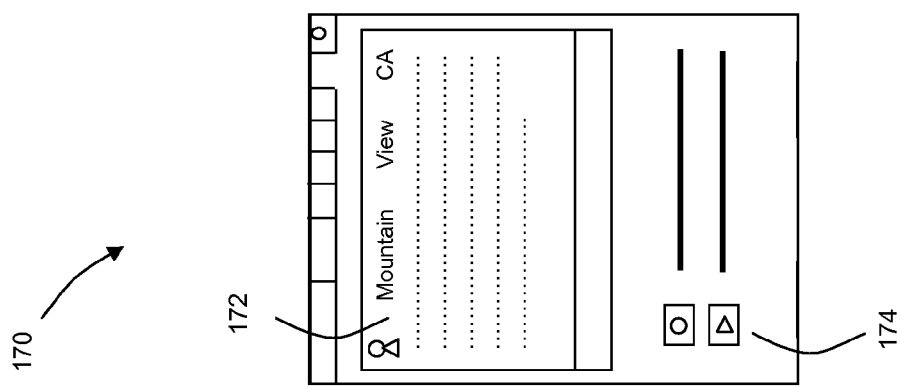
FIG. 1(g) illustrates an exemplary embodiment of a content view.
Figure 1F:
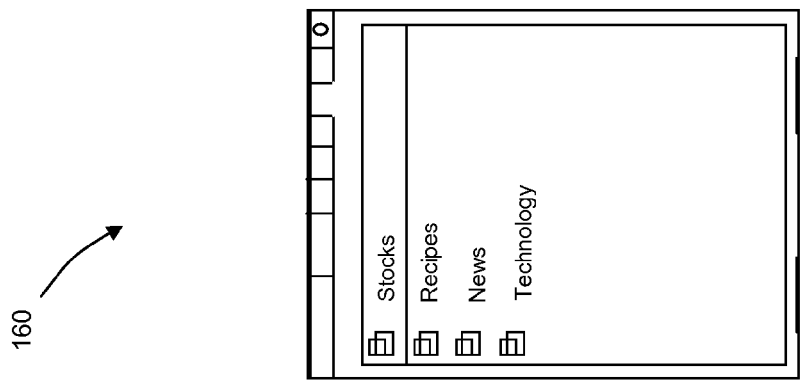
FIG. 1(f) illustrates an exemplary embodiment of a folder view.
Figure 1E:
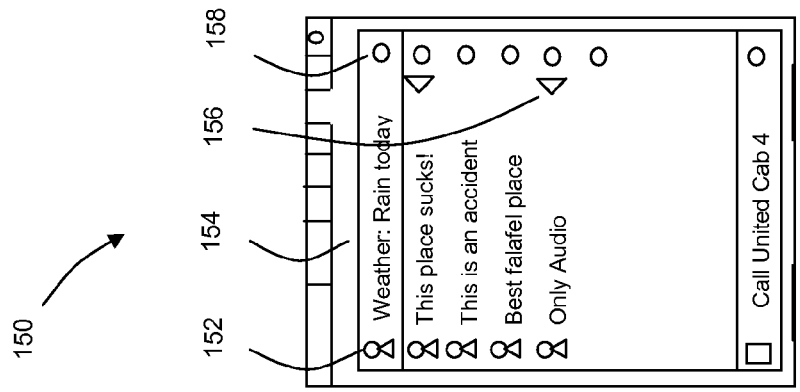
FIG. 1(e) illustrates an exemplary embodiment of an index view.
Figure 1K:
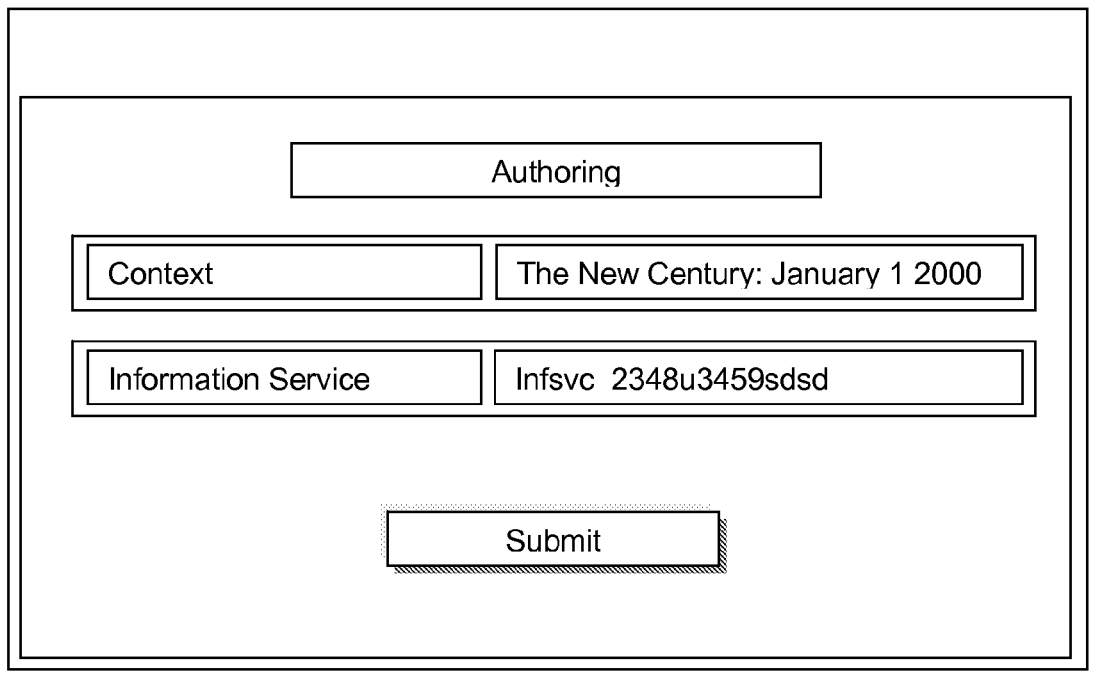
FIG. 1(k) illustrates an alternate exemplary embodiment of a authoring view.
Figure 1L:
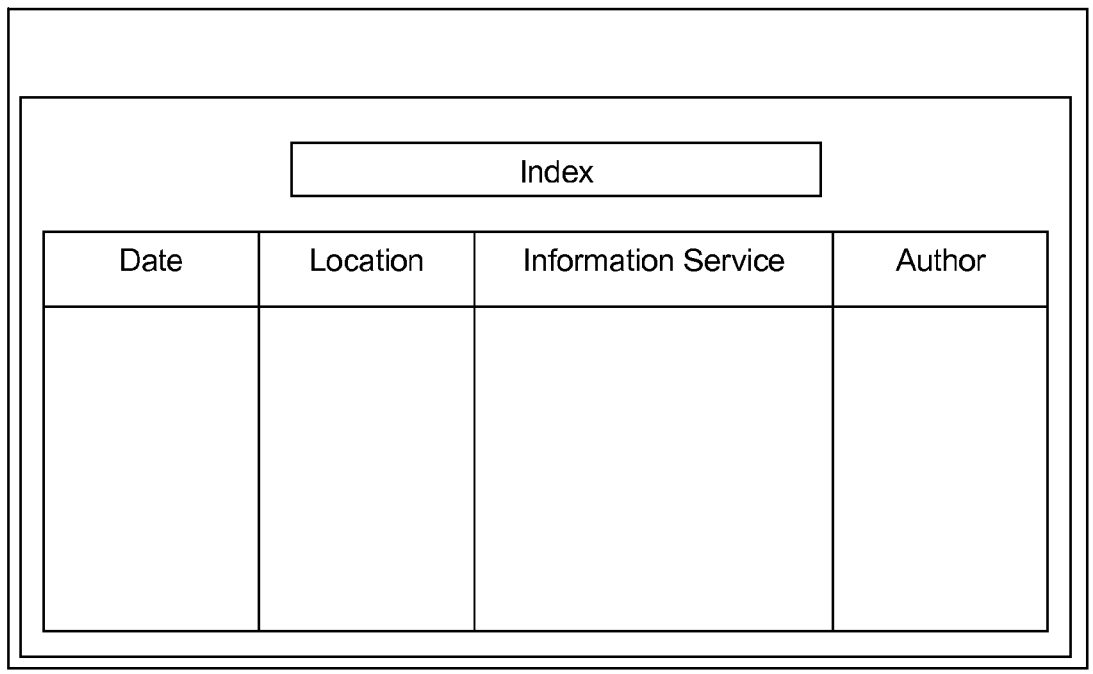
FIG. 1(l) illustrates an alternate exemplary embodiment of an index view.
Figure 1M:
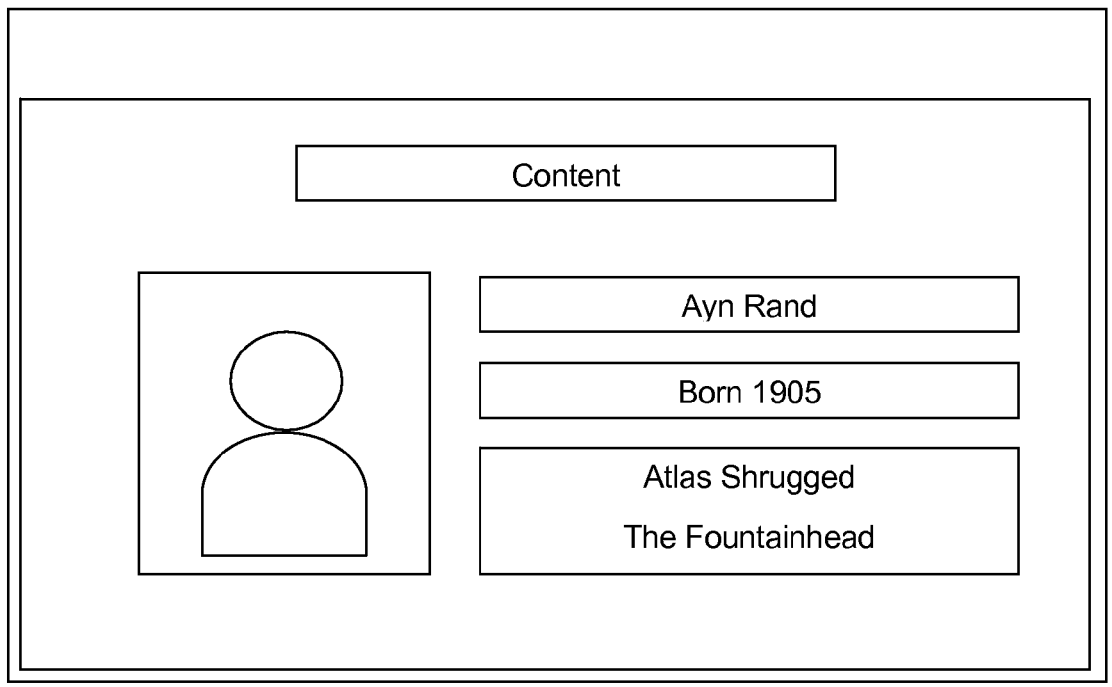
FIG. 1(m) illustrates an alternate exemplary embodiment of a content view.
Figure 1N:
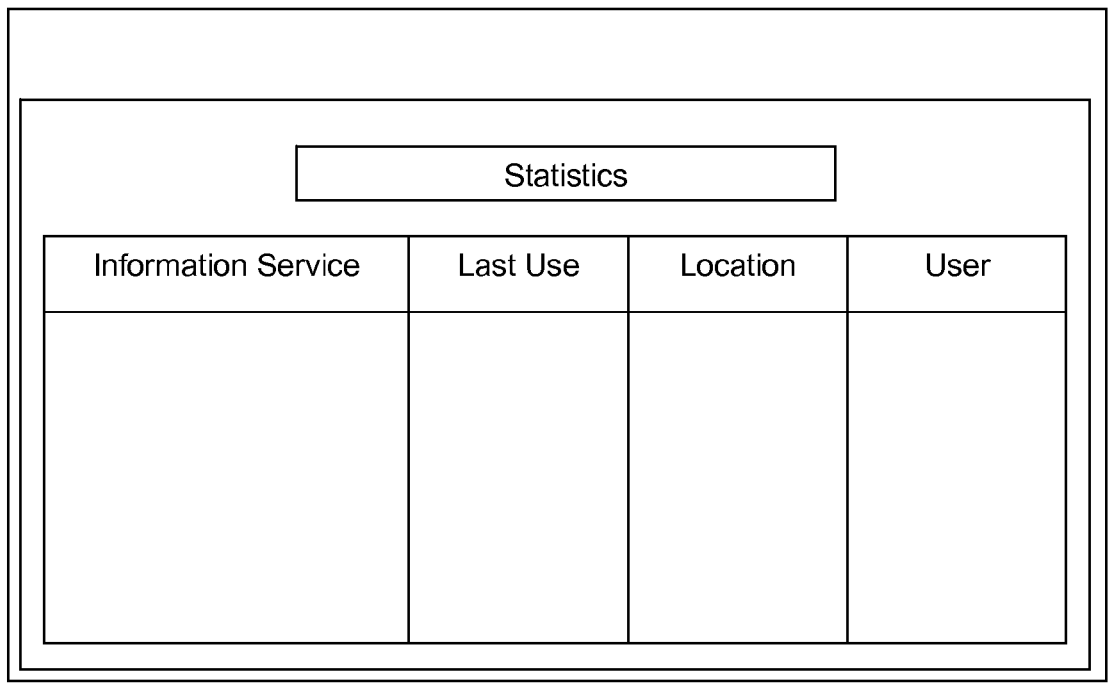
FIG. 1(n) illustrates an exemplary embodiment of a statistics view.

The user interface may be comprised of screens or panes hereafter referred to as "views." The views described are (1) capture (i.e., camera) view, (2) index view, (3) folder view, (4) content view, (5) authoring view, (6) management view, (7) login view, (8) transient view, and (9) statistics view as illustrated in FIGS. 1(a)-1(n). Depending on the implemented features some of these panes may or may not be present. Further, in some embodiments, the views may be integrated into other features available on a client device. For instance, in some embodiments, the capture view may be integrated into a camera software application available on a client device. In other embodiments, the views may be integrated into the web browser functionality of a client device. While the following primarily discusses the visual presentation of the user interface, user input in the form of textual, audio or video inputs is accomplished through other components such as a keypad, microphone or camera integrated into client device implementing the user interface. Further, audio information may be presented through an audio output device such as a speaker integrated into the client device.

User Interface Architecture

FIGS. 1(a)-1(n) illustrate the common structural attributes of exemplary views that may be integrated into embodiments. In some embodiments, where a plurality of views is available for presentation in the user interface, the availability of the plurality of views may be presented in the form of tabbed panel 122 (shown with dashed ellipse).

Tabbed panel 122 includes a tab representing each view, as illustrated in FIGS. 1(b) through 1(j). The tab for the view that is currently selected and active 134 may be presented with a distinct representation to distinguish it from the other nonactive tabs. Tabs may be marked either with graphics and/or text to indicate the identity of each view. This tabbed layout for the views serves as a metaphorical representation of the views being arranged in an overlapping stack with the active view presented prominently on the display.

The nonactive views may either be completely hidden or presented in a minimized representation. Some embodiments may also include user interface elements on the views to represent various activity states in the system such as activity indicator 124 and progress indicator 126.

FIG. 1(a) illustrates an exemplary embodiment for a "login" view 110 of the user interface. The login view enables users to enter authentication parameters such as a username and password for authentication into a system implementing the user interface. The login view may include text fields for entering an alphanumeric user identifier 112 and password 114. The authentication process may either be initiated by clicking on a login button 116 or by choosing a similar option for the menu system integrated into the view. In one embodiment, the login operation is automatically launched without any user input using authentication parameters stored in the system.

FIG. 1(b) illustrates an exemplary embodiment for a "management" or "settings" view 120 of the user interface. The management view presents a mechanism for managing the features of the system such as an address book, lists of friends of user, user groups and their access privileges, account management features such as user names, passwords and subscription levels and user preferences such as user interface, authoring, information classification and presentation preferences. The various features and available options for the features may be presented in a list representation. User may edit or change the settings for the features using menu options or alphanumeric inputs.

FIG. 1(c) illustrates an exemplary embodiment for an "authoring" view 130 of the user interface. The authoring view enables the user to author new content and information services. The newly authored content may include content in audio, visual, textual and graphical media formats. To enable the authoring of content and information services, the authoring view incorporates authoring tools such as a text editor for textual content 132, visual capture controls such as record, pause, stop and edit for authoring still picture and moving video information, audio capture controls such as record, pause, stop and edit for authoring audio information and drawing tools for authoring graphical information 136. In addition, the authoring view incorporates appropriate controls for presenting, inputting and editing metadata such as the time, location and access privileges for the authored information 138.

FIG. 1(*d*) illustrates an exemplary embodiment for a "capture" view 140 of the user interface. The capture view presents a means of displaying live visual imagery and/or recorded visual imagery. When presenting live visual imagery, the capture view displays live video imagery captured from a visual sensor integrated into the device such as a camera. While presenting recorded visual imagery, the capture view displays prerecorded video imagery, either in the form of still images or motion video from a storage medium. The capture of the live visual imagery may also be aided through the use of cues for maintaining the alignment and size of the captured visual imagery as illustrated by the dotted reference lines 142 overlaid on the visual imagery which is presented as a viewfinder 144.

The visual imagery may be a single still image, a sequence of still images or a video sequence. The capture view optionally integrates controls such as play, stop, pause, and edit for controlling the presentation of the recorded visual imagery 148. Also additional controls for operations such as start, stop, record, optical zoom, digital zoom, manual focus, automatic focus, white balance and specialized filters for manipulating the capture and presentation of live visual imagery may be present (not shown). These controls rely on the capabilities of the underlying client device to translate the user inputs at the user interface into appropriate commands for the client device.

In some embodiments, the functionality of the capture view may be provided by a camera software application integrated into the client device. In some embodiments, the capture view may also include controls (not shown) for capturing other multimodal inputs such as audio and textual inputs. Examples include record/stop controls for controlling the capture of the audio input and a text entry box for entering textual information using a keypad integrated into the client device. In some embodiments, the capture view provides feedback on the quality (i.e., lighting, camera jitter, ambient noise level, etc.) of the captured inputs using appropriate controls (not shown).

In addition, the capture view may incorporate a mechanism for augmenting the visual imagery presented with audio, visual, textual, and graphical information along with a mechanism for controlling the presentation of such information. This is represented for instance by the dashed rectangular box graphic 146 overlaid on the visual imagery 144. The visual, textual and graphical augmentation information may be presented as a standalone entity on the user interface, overlaid on top of the visual imagery or embedded into the visual imagery such as to become an indistinguishable part of it. In addition, audio augmentation information may be presented through speakers and tactile augmentation information through tactile transducers respectively.

Besides presenting such augmentation information, the capture view may also include controls (not shown) for authoring or editing such augmentation information either directly in the capture view or in the authoring view. This enables the user to annotate or augment the visual imagery for further use and manipulation. The authoring and editing controls that can optionally be integrated into the capture view include a means of textual information entry such as text box widget to capture additional textual inputs from the user, a free form graphical drawing "pen" and an interface to record audio information through a microphone integrated into a client device. The capture view may also provide controls (not shown) for highlighting or marking up portions of the visual imagery. For instance, text in the visual imagery displayed on the viewfinder 144 may be highlighted for obtaining additional information about the text.

FIG. 1(*e*) illustrates an exemplary embodiment for an "index" view 150 of the user interface. The index view 150 presents one or more available information service options. The individual entries in the list of information service options may incorporate information in audio, visual, textual and graphical media formats. Optionally, the entries in the list may also include indicators representing associated metadata such as the time, location, author 152, information media formats 156 and access privileges 158.

The individual entries in the list may be formatted to present the information services optimally in the available space on the display. Typically, the individual entries include a short text string which may be the title of a web page or a snippet of the textual information that is presented in its entirety in content view 170. The individual entries may also include a "thumbnail" view of the content and information services presented in its entirety in the content view.

Optionally, the index view 150 may incorporate a preview pane 154 that displays additional information relevant to the entry currently selected in the list. The additional information displayed in the preview pane may be textual or graphical and may include details such as an excerpt from the content and information services to be displayed in the content view 170, an abstract from the content and information services to be displayed in the content view 170 or metadata associated with the selected entry. The preview pane may be displayed as an overlapping region on top of the list or as a nonoverlapping region adjacent to the list. The index view 150 optionally also incorporates controls for controlling the presentation of the information services such as play, pause and stop controls for audio, video and animated graphical information (not shown).

In addition, the index view may incorporate controls (not shown) for communicating and storing the information services list presented in the view or a selected information service in the list. The information services list may be communicated using e-mail, SMS, MMS, fax, data networks, or circuit-switched networks. The information services list may also be stored on a system server or desktop personal computer for later access through the client user interface or through other means such as a web browser on a personal computer. Controls for control, communication and storage of information services (not shown) may be integrated with a menu system or integrated into index view 150.

Further, in some embodiments, index view 150 may incorporate controls for refining the list of information services provided (not shown). Such controls may be in the form of a text entry field where the user can input additional textual information for refining the list or the controls may be in the form of audio information capture through a microphone integrated in to the client device for input of the refinement inputs in audio format.

The system may use speech recognition to convert refinement inputs in audio format to a machine readable form. The refinement inputs may be used as an input to refine or filter the entries presented in the index view.

Refinements may be based on criteria such as the type of an information service (regular, commercial, sponsored, etc.), the content of an information service, metadata of an information service or others. In embodiments that support textual input of the refinement information, the text input control may be presented adjacent to the list or in a manner overlapping the list completely or partially. The text input control may also contain predefined textual information generated by the client.

For instance, parameters used to generate the list of information services presented in index view 150 may be presented in the text input control. Further, the list presented in index view 150 may have one or more columns. In some embodiments, the list may not be structured into a regular geometric layout and may have arbitrary positioning on the display.

FIG. 1(f) illustrates an exemplary embodiment for a "folder" view 160 of the user interface. The folder view presents a visual mechanism for organizing the information services displayed in index view 150. The information services can be organized into hierarchical collections called folders. The folders are referred to by an associated title. The folder view 160 presents a visual representation of the collection of folders at a chosen level in the hierarchy.

The organization of the information services into folders is performed either manually by users of the interface or automatically by the system using parameters such as the analysis of the content and information services, user preferences or past user behavior in using the system. In some embodiments such folders may be created by users using textual "tags." The folders may also be communicated using e-mail, SMS, MMS, fax, data networks, or circuit-switched networks. In some embodiments, folder view 160 may include controls for refining the list of folders presented using inputs such as text or audio.

FIG. 1(g) illustrates an exemplary embodiment for a "content" view 170 of the user interface. The content view 170 presents information services in their entirety for consumption by the user. The content view 170 includes support for the presentation of information in audio, visual, textual, and graphical formats 172 as well as controls 174 such as play, pause, and stop controls for controlling the presentation of information services that are presented over a time duration as in the case of audio, video, or animated graphical information. In some embodiments, content view 170 may include controls for refining the information services presented.

FIG. 1(h) illustrates an alternate exemplary embodiment for a "content" view 180 of the user interface. The content view 180 presents information services such as to maximize the use of the available display space for presenting information services. In contrast to content view 170, content view 180 has fewer controls displayed on the display to maximize the display space available for presenting information services.

Information services presented in content view 170 and content view 180 may be formatted for a concise and intuitive presentation of the information. Thus, extended textual content, such as the content from a web page, which may be cumbersome to read on a small form factor screen, is abridged in the form of excerpts and summaries for presentation.

In addition, a "thumbnail" picture representation of the information as it would be presented on a full featured visual display environment such as a personal computer based web browser might be included in the content view to provide a hint to the original formatting of the information prior to its reformatting. When such a thumbnail picture is included, portions of the thumbnail picture that represent the information presented elsewhere in the content view might optionally be highlighted. Similarly, other content and information services may be reformatted to suit the presentation capabilities of a computer system implementing the user interface.

In some embodiments, hyperlinked content and information services may be presented in the content view. Hyperlinked content is presented in the content view, similar to its representation on a full featured environment such as a personal computer based web browser. In this mode of presentation, the presented content and information services include embedded hyperlinks that may be traversed by selecting and activating them. Activating the hyperlinks may result in the presentation of the content and information services hyperlinked to the content or information service presented currently. The selection and activation of the hyperlinks may be performed using various input components integrated into the client device. Activating a hyperlink may result in the presentation of the hyperlinked content using other components of the client device such as a web browser.

Hyperlinked content and information services may also be reformatted and presented in the content view such that hyperlink traversal is potentially reduced or minimized. For instance, a plurality of content and information services linked to a specific content or information service through hyperlinks may be reformatted into nonhyperlinked format such that the top level content and information service is presented earlier followed sequentially by the linked content and information services, rather than requiring a user to follow the links individually.

For instance, in the case of a textual content hyperlinked to a plurality of other textual content, a single "flat" textual representation may be presented where the top level textual content is followed by the content from the other textual content hyperlinked with the top level one. Such reformatting of hyperlinked content and information services may also be combined with other reformatting techniques such as the abstract and excerpt generation described earlier. The reformatted hyperlinked content and information services may play a role in the presentation of content sourced from the World Wide Web and the sponsored information services.

The content view 170 may also provide controls (not shown) for highlighting or marking up portions of the displayed information, for instance the highlighting of text or an image, for obtaining additional information about the highlighted information or for augmenting the highlighted information with other user authored or system generated information. The content view 170 may also include controls to demarcate sections of multimedia content and to select regions of the demarcated multimedia content in order to obtain additional information or to augment it with user authored information.

Alternately, the multimedia content may incorporate demarcations innately and content view controls may enable selection of such predemarcated content sections. For example, it might be possible to select a human form in a video delineated by an outline by clicking on a joystick or button. Similarly it may be possible to select a segment of audio by clicking on the joystick to mark the start and end points of the audio segment.

In addition, the content view 170 may also incorporate controls (not shown) for communicating and storing the information presented in the view. The information service presented in the content view may be communicated using e-mail, SMS, MMS, fax, data networks, or circuit-switched networks or stored on a central server or desktop personal computer for later access through the user interface presented here or through other means such as a web browser.

FIG. 1(i) illustrates an exemplary embodiment for an "interim content" or "transient" view 190 of the user interface. The transient view 190 may be presented on the client device display when the system is transitioning between different views or when the system is busy with an operation over an extended duration of time. Thus, in some embodiments, the transient view presents interstitial information services, i.e., information services that are provided in between other system activity. For instance, transient view 190 may be presented when the system is analyzing multimodal inputs for identifying relevant information services. Transient view 190 may be used to present information services including content in text, audio, video and other media types.

FIG. 1(*j*) illustrates an exemplary embodiment 200 for menus used in the user interface. The user may also initiate commands for the system using menu 202. In some embodiments, menu 202 may be presented as an overlay on top of the views. In some embodiments, menu 202 may be presented adjacent to other elements of the user interface. In some embodiments, the menus may not have a visual representation and may be controlled through audio inputs.

FIG. 1(*k*) illustrates an alternate exemplary embodiment of an authoring view 210 for use on a full-featured computer system such as a personal computer. For example, in some embodiments, information services may be authored using various content and information service logic provided through alternate authoring view 210 using a web browser integrated into a personal computer. Optionally, alternate authoring view 210 may also allow uploading of information services including associated logic and content. In some embodiments, the functionality of alternate authoring view 210 may be integrated into a web browser on a personal computer, for instance using a toolbar.

FIG. 1(*l*) illustrates an alternate exemplary embodiment of an index view 220 for use on a full-featured computer system such as a personal computer. For example, a web browser on a personal computer may be used to present the information in index view 150 with greater details. Such an alternate index view may optionally present a means to access a historical record of all information presented through the system. In another embodiment, the alternate index view information may be presented in the form of an e-mail message on an e-mail application.

FIG. 1(*m*) illustrates an alternate exemplary embodiment of a content view 230 for use on a full-featured computer system such as a personal computer. For example, a web browser on a personal computer may be used to present the information in content view 170 or 180 with greater details. Such an alternate content view may optionally present a means to access a historical record of all information presented through the system. In another embodiment, the alternate content view information may be presented in the form of an e-mail message on an e-mail application.

FIG. 1(*n*) illustrates an exemplary embodiment of a statistics view 240. This view presents historical data on usage of the service. Users may use this view to view their use of the system over time. For instance, they can view all past queries for content made through the system or all past multimodal inputs they stored in the system.

Operation

The views of the user interface discussed above are presented on a display integrated into a client device. In some embodiments, the user interface may not be active at all times. In such embodiments, the user interface may be activated through user input or by the system based on system-determined criteria.

An exemplary embodiment of such a client device is a cellular phone, which incorporate a number of software applications in an operating system environment. In some embodiments, a user may activate the application incorporating the user interface by pressing a dedicated button on the client device, pressing and holding a dedicated button on the device or selecting and activating an icon in a graphical user interface.

In some embodiments, the system may automatically activate the functionality of the system incorporating the user interface by monitoring system parameters such as client device motion, changes in lighting, time of day, etc.

In some embodiments, the application or functionality incorporating the user interface is activated through a communication message such as an SMS received by the client device. Upon activation, one of the views of the user interface is presented and user interaction is continued. In some embodiments, the communication message may also be generated by the system upon receiving responses to other inputs initiated by the user, such as a SMS message.

A user may interact and control the features of the user interface using input components integrated with the client device such as keypad, joystick, thumb wheel and other pointing and cursor control input mechanisms. A user may have the system present the various views described earlier using appropriate inputs. For instance, on a device equipped with a joystick input, the user may switch between the adjacent views by flicking or moving the joystick to the left or right to select and display the view in the corresponding direction.

Upon such selection of a view, the active view is displayed on the user interface and tabbed panel 122 updated to reflect the view that is currently active. In some embodiments, the system may present views automatically based on system determined criteria. For instance, transient view 190 may be presented by the system automatically when a system operation is being performed over an extended duration of time. The user may also initiate commands for the system using menus 192. Menu 192 may be presented when triggered through a user input component such as keypad or soft key entry or automatically by the system under predefined system states.

When the system is processing or communicating information, activity indicator 124 maybe activated. In some embodiments, activity indicator 124 is represented in the form of an icon that flashes to indicate the busy state of the system. In some embodiments, the progress of the execution of an extended operation may be represented by a progress indicator 126 that is updated to reflect the extent of completion of the operation. The progress indicator may be in the form of a linear strip representing the extent of the operation in its entirety, overlaid with a second linear strip of a different color that denotes the extent of the completion of the operation.

The dark portion of the progress indicator 126 representing the extent of the operation in its entirety which is overlaid by the light portion of progress indicator 126 representing the extent of completion of the operation. In some embodiments, activity indicator 124 and progress indicator 126 may be represented by other graphical representations. In some embodiments, activity indicator 124 and progress indicator 126 may be presented using output components other than the client device display.

Capture view 140 enables the user to capture multimodal information to initiate interaction with the system. Information services identified and presented as relevant to multimodal information by the system may be presented independent of the multimodal information or such as to augment the multimodal information. In embodiments where information services are presented independent of the multimodal information, the information services may be presented using index view 150, folder view 160, and content view 170 and 180. In embodiments where information services are presented such as to augment the multimodal information, the presentation of the information services can be in one of two modes: (1) passive augmentation mode and (2) active augmentation mode.

In the passive augmentation mode, the user captures multimodal information using the capture view. The user may use the multimodal information to access relevant information services using the following processes: (1) request the system to automatically present an augmented version of the multimodal information (smart mode) or (2) present the user with a menu of augmentation options integrated with the multimodal information from which the user can select (advanced options mode) or (3) markup areas of the multimodal information for which augmentation information services can then be requested (user-controlled mode).

In some embodiments operating in the smart mode of operation, the augmentation information services are automatically generated and presented by the system upon capture of the multimodal information without additional user input. In some embodiments operating in the smart mode of operation, the augmentation information services are generated and presented by the system upon explicit request by the user through inputs such as a key press or joystick click following the capture of the multimodal information.

In the advanced options mode of operation, the augmentation options may be presented in the capture view in the form of graphical, textual, or audio overlays and the user may then select among the available augmentation options. The selection of an augmentation option may trigger the presentation of an extended list of information services in index view 150, the presentation of a information service in content view 170 or 180 or the authoring and association of new content and information services to augment the multimodal information in authoring view 130.

In some embodiments operating in the user-controlled mode of operation, the user explicitly marks up the region of the captured multimodal information for which he seeks augmentation information and then requests relevant augmentation information services with an explicit input such as a key press or joystick click.

The 3 modes of passive augmentation may be illustrated by the following example scenario. A still image of a page of text is captured and displayed in capture view 140. In the smart mode of operation, information services such as links to information on the World Wide Web relevant to the captured textual information and dictionary lookup for words in the textual information are automatically presented to the user or upon request by the user in the index view. The user request may be input using a key on the client device.

In the advanced options mode of operation, the user requests the augmentation information options upon which augmentation information, for instance, in the form of graphical highlights for the words in the textual information is overlaid on top of the image. The user may then select a highlighted word or a set of highlighted words for which he wants to request information services and request associated information services.

In the user-controlled mode of operation, the user selects a region of the visual imagery using a drawing cursor integrated in to the user interface and then requests associated information services. Audio augmentation information may be presented through an audio output device such as a speaker integrated into the client device.

In some embodiments operating in the active augmentation mode of operation, the augmentation of the visual imagery happens without any explicit user input. When the user points the camera built into a client device at a scene, the live visual imagery sensed by the camera is displayed in the capture view viewfinder 144. Simultaneously, augmentation content and information services are overlaid on the visual imagery without any additional user input to request the augmentation information services.

For instance, if the camera is scanned over a page of text, some words may appear highlighted, changed in color or be augmented in other forms in viewfinder 144 to indicate the availability of information services relevant to the words. In some embodiments operating in the active augmentation mode of operation, as the camera is scanned over a scene, the system may recognize the availability of augmentation information services for certain regions of the scene and alert the user with an audio beep along with highlighting of the regions.

In some embodiments operating in the active augmentation mode of operation, the augmentation may be presented as icons, emoticons or other graphical symbols and marks. Thus, in the active augmentation mode of operation, augmentation information services are presented as the visual imagery is being captured in contrast to the passive augmentation mode of operation, where augmentation information services are presented after the visual imagery is captured. The active augmentation mode of operation is also applicable to visual imagery obtained from storage.

In some embodiments, interim content and information services may be presented on transient view 190 while the system is busy with an operation over an extended duration of time or on other instances as determined by the system. The information services presented in transient view 190 may include sponsored information services or information on the state of the system. The information services presented in transient view 190 may or may not be relevant to the multimodal input information and other information services being accessed by the user through the system. Examples of interim content include simple information such as news articles, advertisements, quotations, tip of the day, or other more advanced information services.

Figure 2:
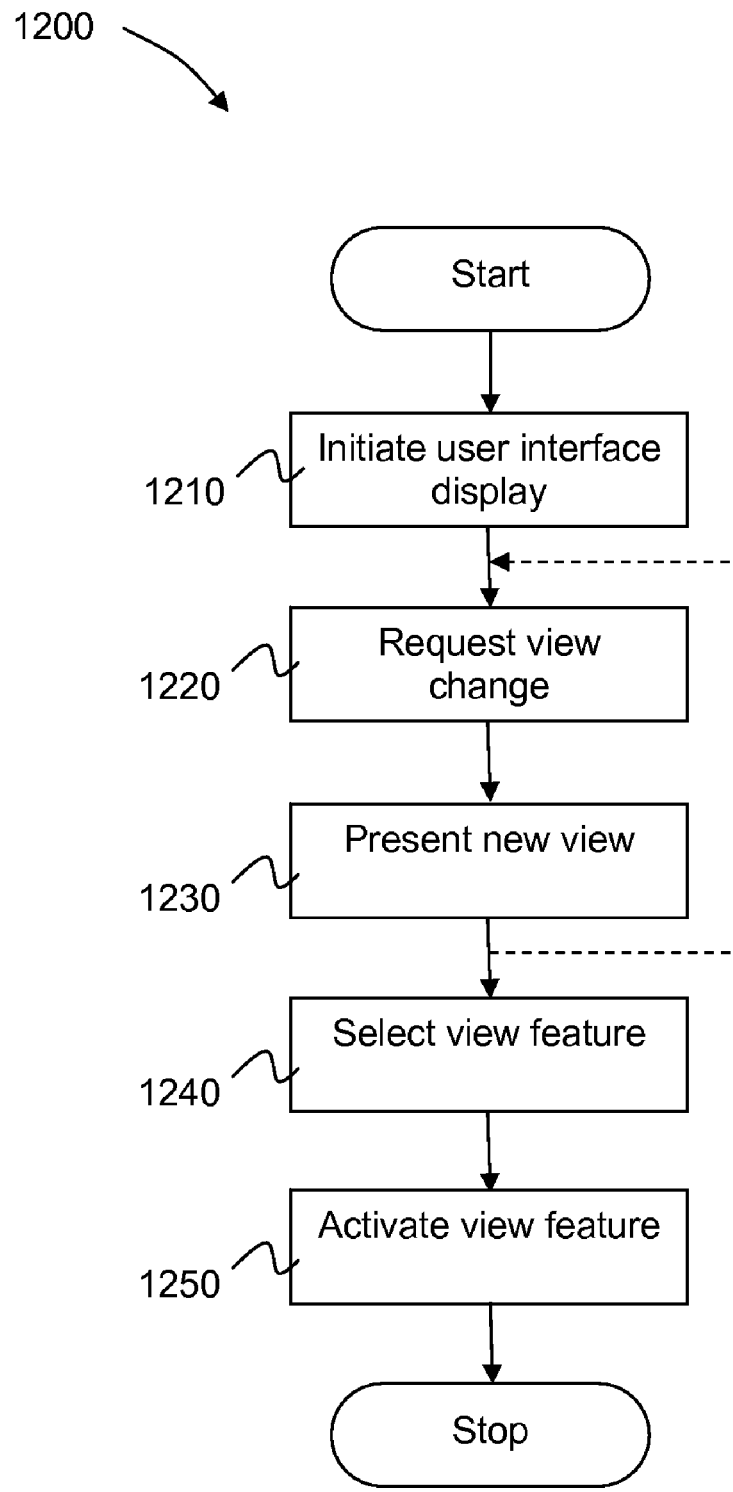
FIG. 2 illustrates an exemplary process for navigating between views.

Some embodiments of the user interface may be understood with reference to the process of a user's interaction with the system through the user interface. FIG. 2 illustrates an embodiment of a process of operating the user interface. Process 1200 includes presenting a view of the user interface, receiving a view change signal and changing the view presented on the user interface, receiving a selection of a part of the user interface and displaying that selection, and receiving a feature selection and operating the selected feature.

Process 1200 and other processes of this description are implemented as a set of modules, which may be process modules or operations, software modules with associated functions or effects, hardware modules designed to fulfill the process operations, or some combination of the various types of modules. The modules of process 1200 and other processes described herein may be rearranged, such as in a parallel or serial fashion, and may be reordered, combined, or subdivided in various embodiments.

Process 1200 initiates with display of the user interface at module 1210. Thus, the active view of the user interface may be presented in the foreground of the user interface. The tab corresponding to the active view in tabbed panel 122 may be presented with a representation denoting its active state.

At module 1220, a request to change the view presented on the user interface is received. This may be a user input such as a key press or joystick input, as described above. At module 1230, the view presented in the user interface is changed, such as to the next view. A user may cycle through the various views of the user interface due to repetition of these two modules (1220 and 1230).

At module 1240, features of the user interface are selected. In particular, a single feature or option is selected at any given time. The corresponding functionality for the feature is then operated or executed at module 1250. This may result in various actions, such as augmentation of multimodal information, following a link, accessing detailed views of information services, or capturing multimodal information, for example.

Figure 3:
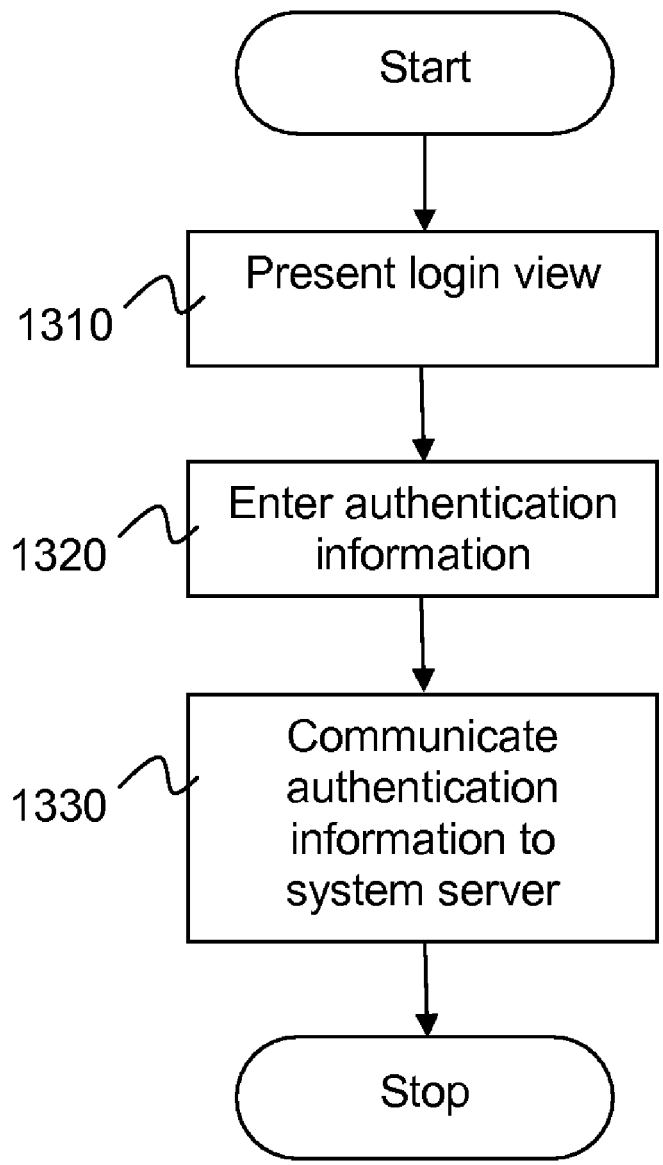
FIG. 3 illustrates an exemplary process for using the login view.

FIG. 3 illustrates an embodiment of a process 1300 of authenticating to the system using login view 110 integrated into a client. Upon presentation of login view on the display 1310, the user enters a textual user identifier and password 1320 into the respective text fields 112 and 114. The user then highlights the login button 116 and activates by clicking on a joystick. The client then encodes and communicates the authentication information to the system server 1330.

Figure 4:
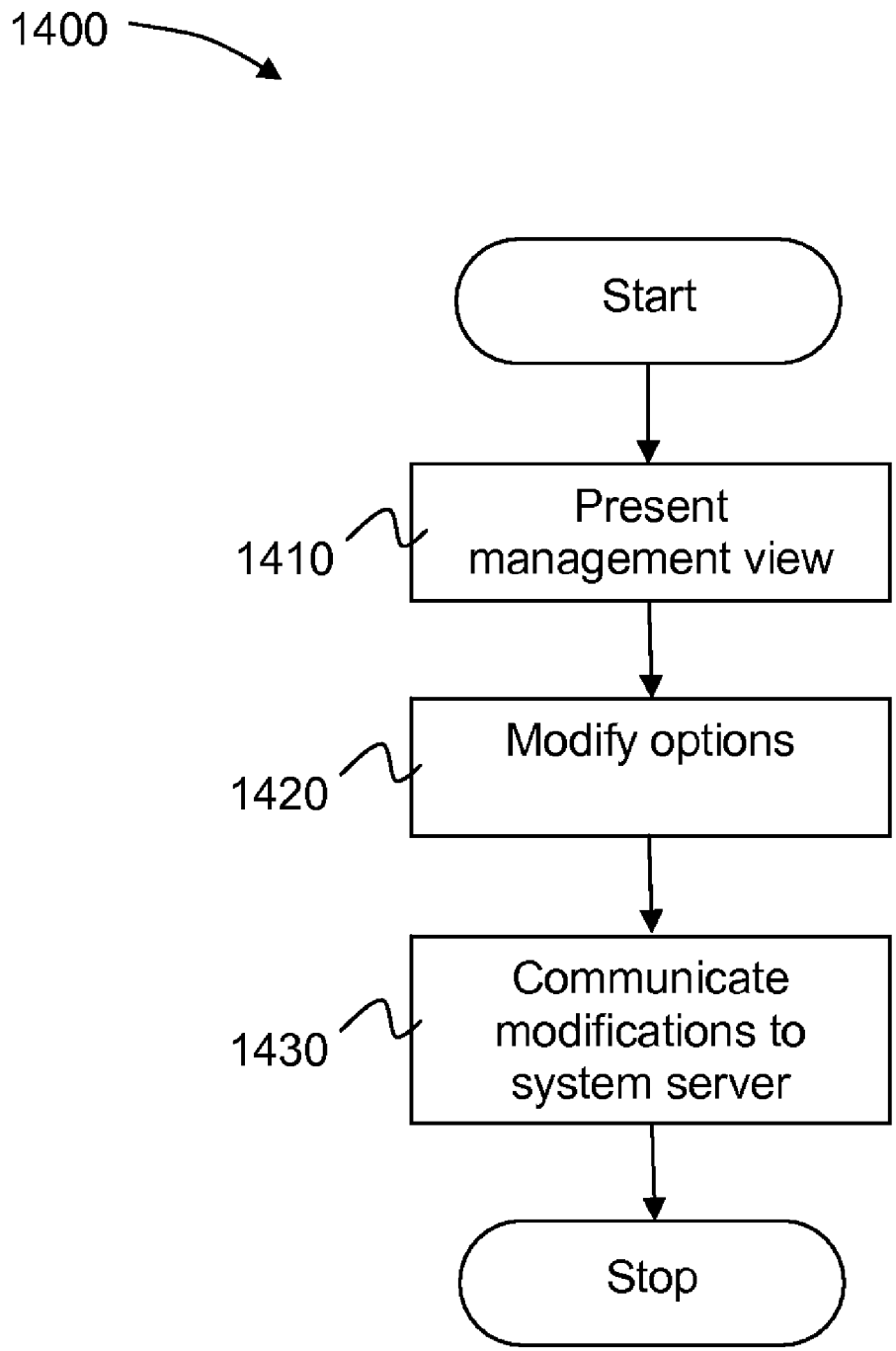
FIG. 4 illustrates an exemplary process for using the management view.

FIG. 4 illustrates an embodiment of a process 1400 of managing user preferences using management view 120 integrated into a client. Upon presentation of management view 120 on the display 1410, the user selects various options for user preferences for modification 1420. Optionally, this process may include the management of a list of friends of the user. The user may finalize the changes by activating an appropriate menu entry. The client then encodes and communicates the modification information to the system server as required 1430.

Figure 5:
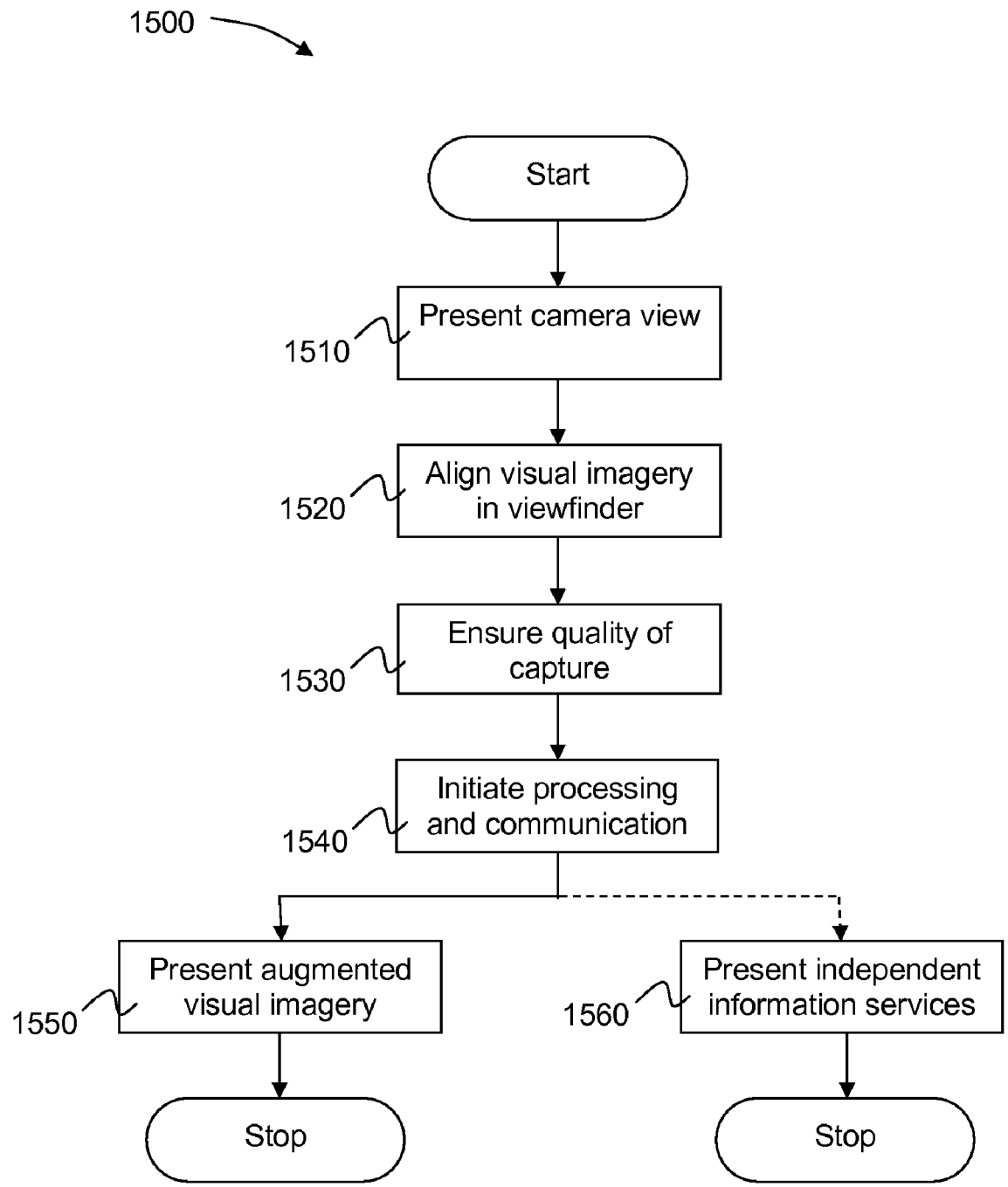
FIG. 5 illustrates an exemplary process for using the capture view.

FIG. 5 illustrates an embodiment of a process 1500 of using the capture view 140 integrated into a client. Upon presentation of capture view 140 on the display 1510, a live rendering of the visual imagery captured by the camera is displayed as a viewfinder 144 with reference marks 142 for aiding the users in capturing visual imagery with the correct resolution and orientation.

A user may align the visual imagery in the viewfinder to the reference marks through rotation and motion of the camera relative to the scene being imaged 1520. The user may also use graphical indicators for the characteristics of the captured visual imagery 148 to ensure the visual imagery is captured with appropriate quality required by the system 1530. The user may then initiate the communication and processing of the captured visual imagery using appropriate inputs on the client device keypad or joystick 1540.

Relevant information services may optionally be then presented as an augmentation on the visual imagery 1550. The graphical marks 146 that are part of the information services augmenting the visual imagery may be in the form of rectangles surrounding the regions of interest, a change in the hue, saturation or brightness of the area in and around the regions of interest, change in the font and emphasis of textual elements, icons placed near the regions of interest, or other such marks. In some embodiments, information services may be presented 1560 in index view 150 or content view 170 and 180.

Figure 6:
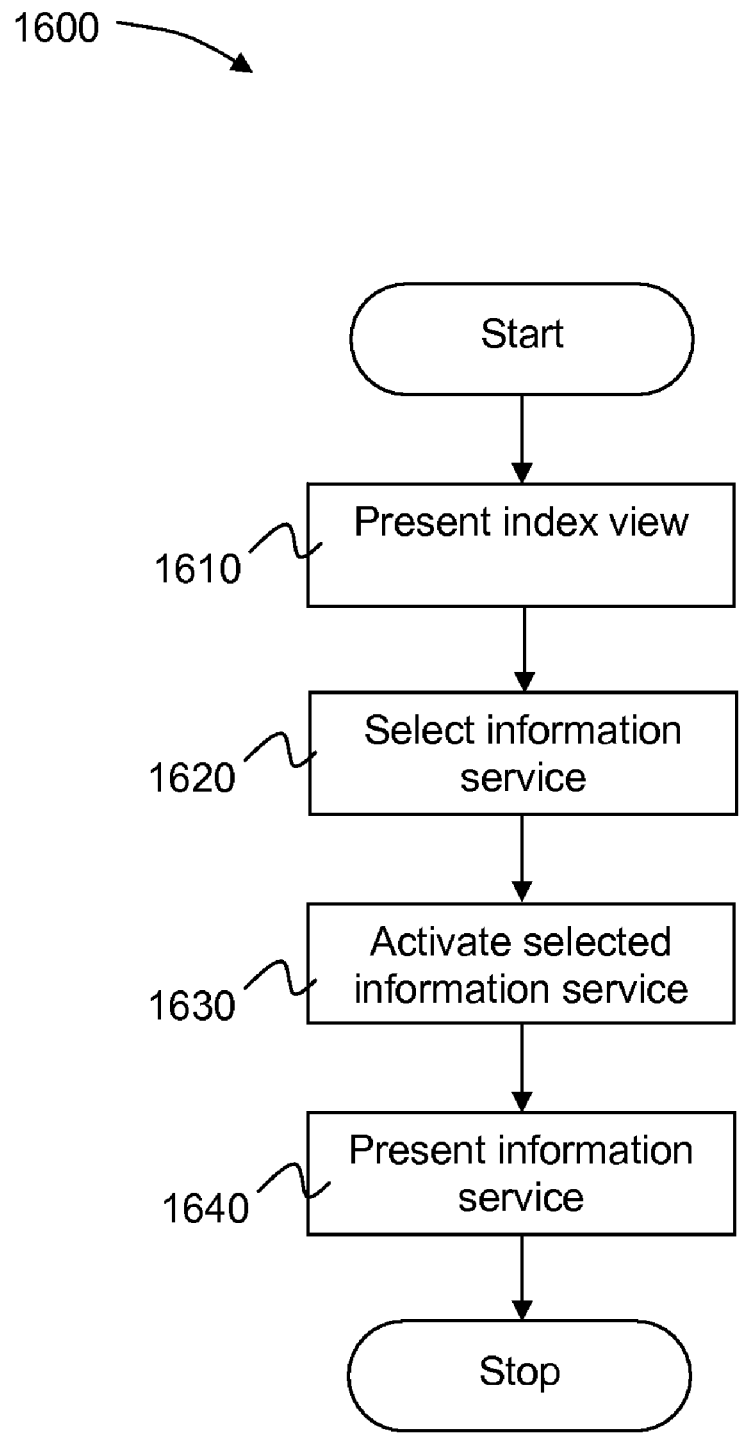
FIG. 6 illustrates an exemplary process for using the index view.

FIG. 6 illustrates an embodiment of a process 1600 of using the index view 150 integrated into a client. Upon presentation of index view 140 on the display 1610, a list of information services relevant to a selected context may be presented. The user may use the cursor control or pointing input components integrated into the client device to select one of the information service options 1620.

Upon activation of the selected information service 1630, the information service may be presented 1640 in content view 170 and 180 or in the authoring view 130. Users may optionally input refinement information in textual or audio format and have the list of information services presented updated automatically. This enables incremental refinement of the information services presented using the additional user input. The refinement process may also require the use of additional menu options or other controls such as a button press.

Figure 7:
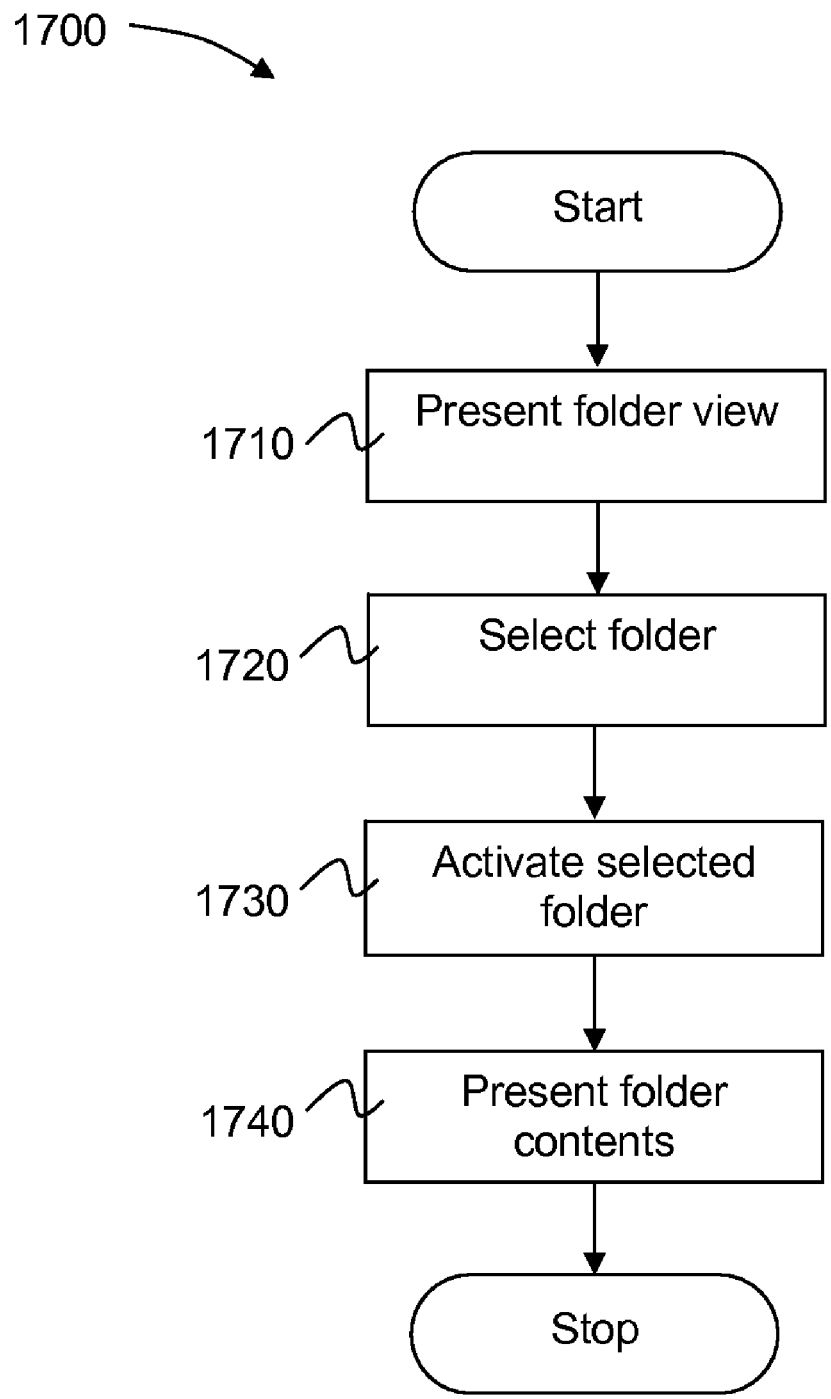
FIG. 7 illustrates an exemplary process for using the folder view.

FIG. 7 illustrates an embodiment of a process 1700 of using the folder view 160 integrated into a client. Upon presentation of folder view 150 on the display 1710, a list of folders used to classify information services may be presented. The user may use the cursor control or pointing input components integrated into the client device to select one of the folders 1720.

Upon activation of the selected folder, information services in the folder may be presented 1730 in index view 150, content view 170 and 180 or in the authoring view 130. If a folder contains nested folders then the contained folders are presented 1740 in folder view 160. Optionally, a user may also use the folder view to classify information services or manage the classifications.

Figure 8:
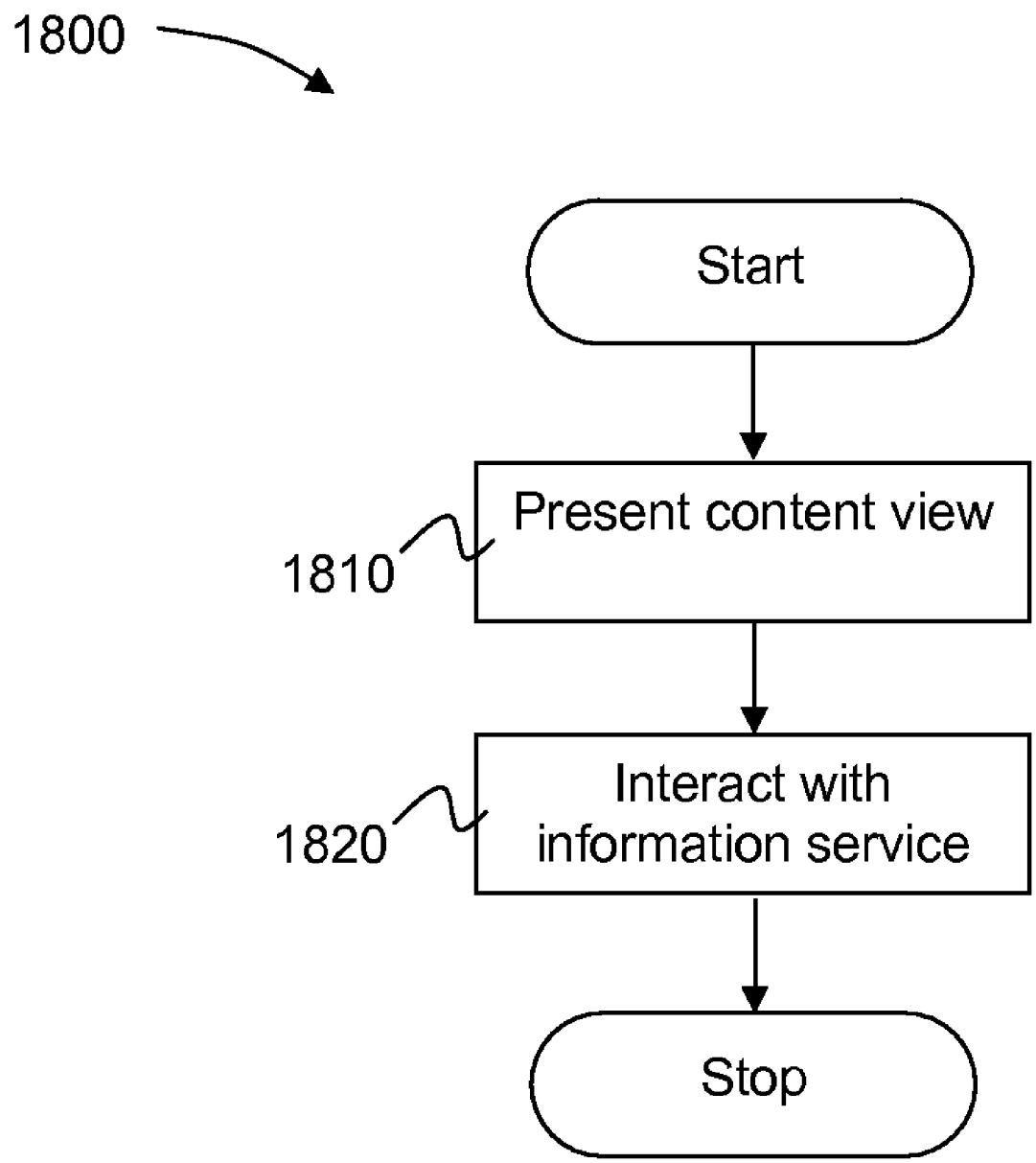
FIG. 8 illustrates an exemplary process for using the content view.

FIG. 8 illustrates an embodiment of a process 1800 of using the content view 170 integrated into a client. Upon presentation of content view 170 on the display 1810, an information service selected in the capture or index views, is presented. The user can use the cursor control or pointing input components integrated into the client device for extended interaction with the features of the information service 1820. For instance, the presented information may be scrolled using cursor control or pointing input components and multimedia content included in the information services may be controlled using the available controls.

Figure 9:
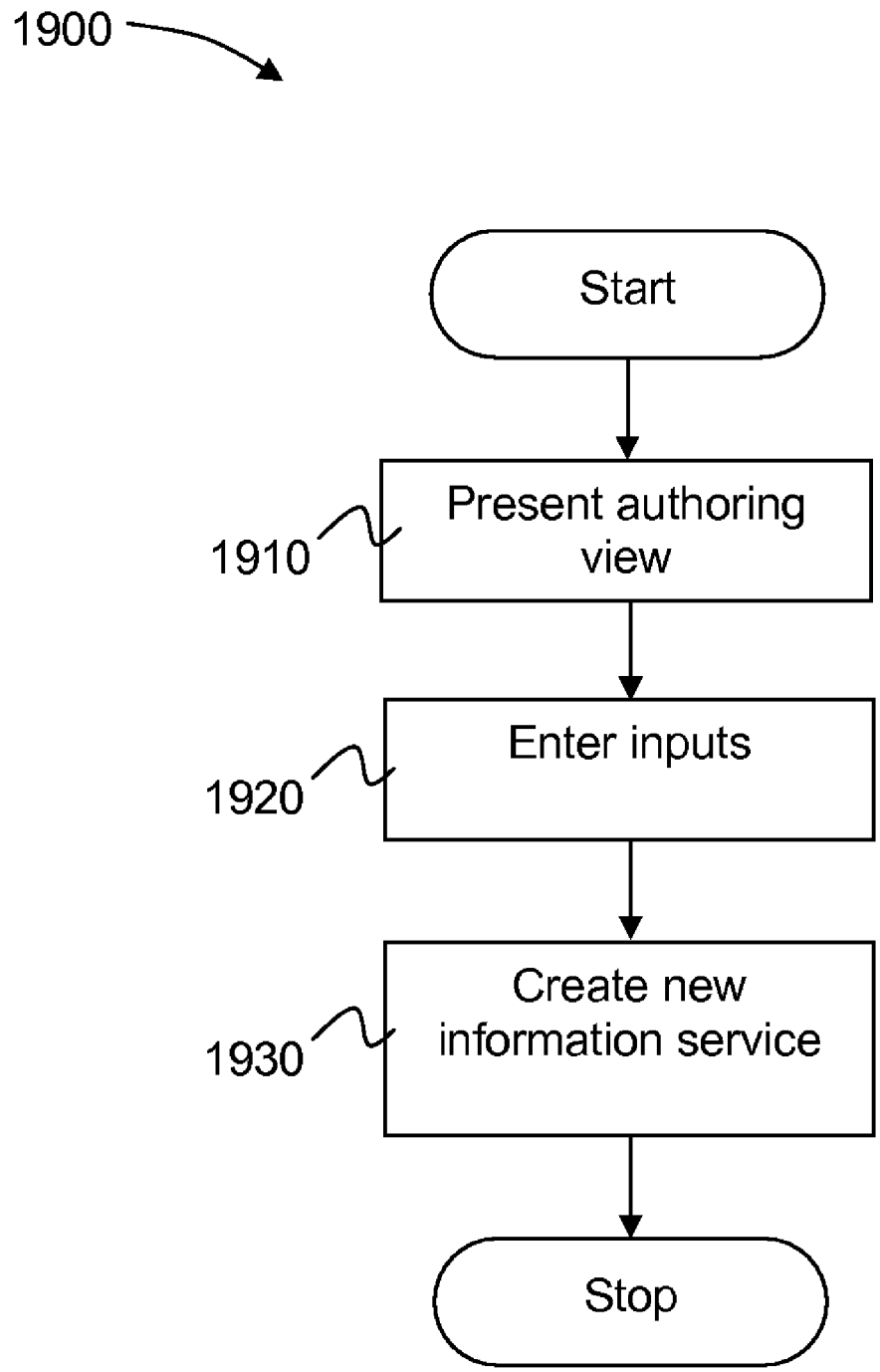
FIG. 9 illustrates an exemplary process for using the authoring view.

FIG. 9 illustrates an embodiment of a process 1900 of using the authoring view 180 integrated into a client. Upon presentation of authoring view 170 on the display 1910, a user may author a new information service using the presented controls 1920. The user may use one or more entities of audio, visual, textual or graphical information to compose the new information service.

For instance, after activating the audio record control he may input audio information through a microphone integrated into the client device. Textual inputs can be input through a keypad or keyboard integrated into the client device. After entering the inputs, the user may then activate menu commands 1930 to compose a new information service from the inputs and associate it with a context selected in capture view 140.

Figure 10:
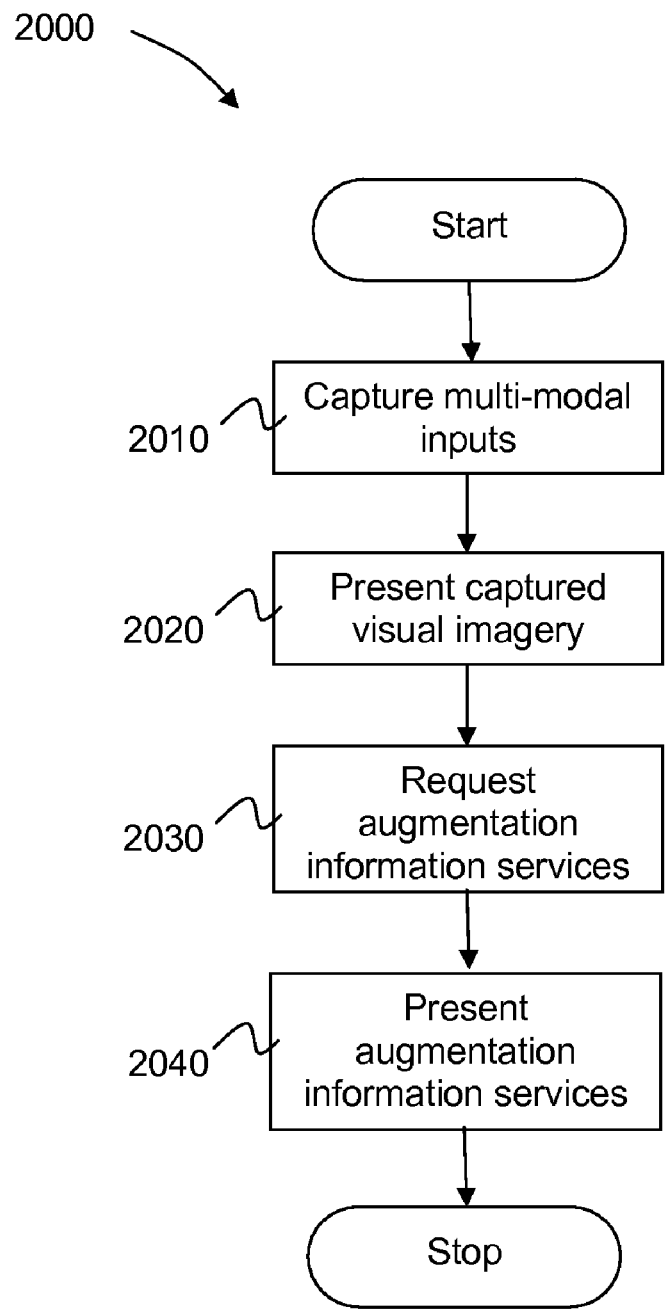
FIG. 10 illustrates an exemplary process for presenting information services in the smart mode of operation for passive augmentation.

FIG. 10 illustrates an embodiment of a process 2000 for presenting information services in the smart mode of operation of passive augmentation of visual imagery. A user captures multimodal inputs 2010 and the captured visual imagery is presented on the capture view of the user interface 2020. The user then requests related information services 2030 and is presented the augmentation information services along with the visual imagery 2040.

Figure 11:
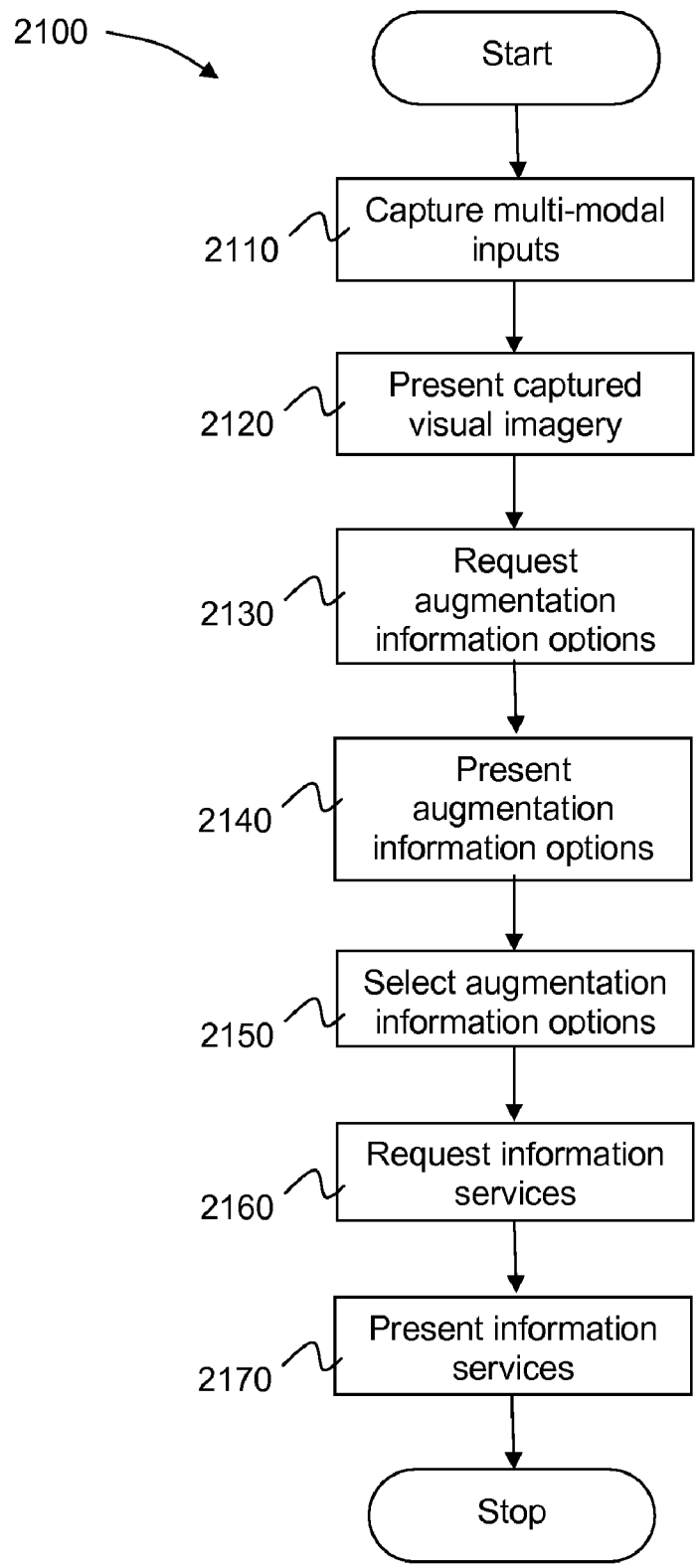
FIG. 11 illustrates an exemplary process for presenting information services in the advanced options mode of operation for passive augmentation.

FIG. 11 illustrates an embodiment of a process 2100 for presenting information services in the advanced options mode of operation of passive augmentation of visual imagery. A user captures multimodal inputs 2110 and the captured visual imagery is presented on the capture view of the user interface 2120. The user then requests related augmentation information options 2130 and is presented the augmentation information service options 2140. The user then selects one or more augmentation information options 2150 and requests related information services 2160. Then, the user is presented with the related information services 2170.

Figure 12:
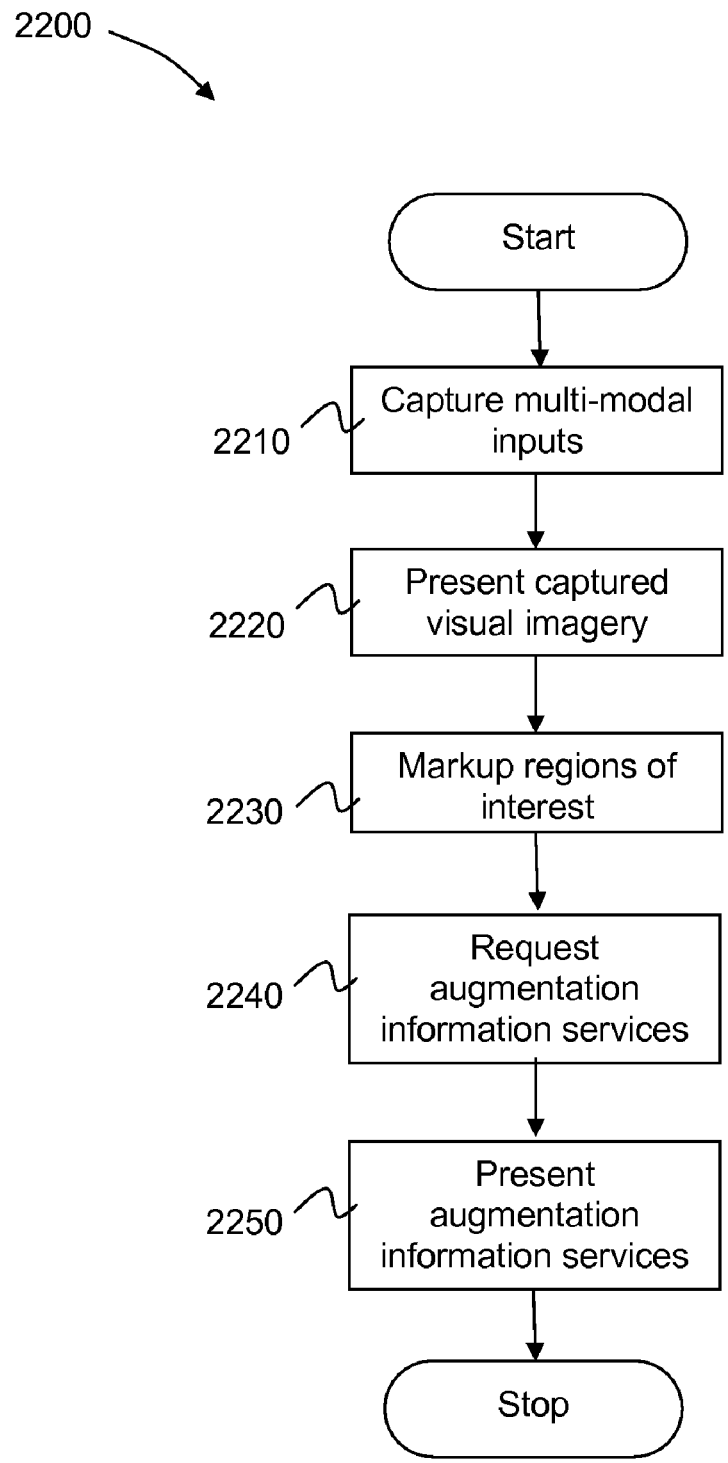
FIG. 12 illustrates an exemplary process for presenting information services in the user-controlled mode of operation for passive augmentation.

FIG. 12 illustrates an embodiment of a process 2200 for presenting information services in the user-controlled mode of operation of passive augmentation of visual imagery. A user captures multimodal inputs 2210 and the captured visual imagery is presented on the capture view of the user interface 2220. The user then marks up regions of interest in the visual imagery 2230 and requests related augmentation information services 2240. Then the user is presented the related augmentation information services 2250.

Figure 13:
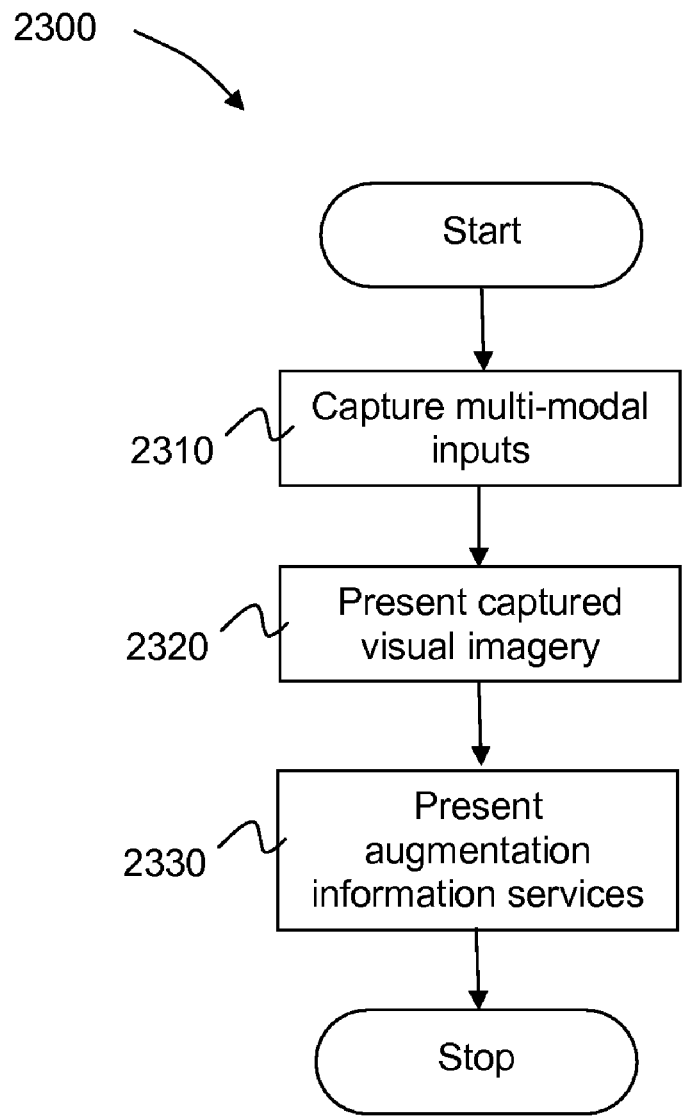
FIG. 13 illustrates an exemplary process for presenting information services for active augmentation.

FIG. 13 illustrates an embodiment of a process 2300 for presenting information services with active augmentation of visual imagery. A user captures multimodal inputs 2310 and the captured visual imagery is presented on the capture view of the user interface 2320. Along with the captured visual imagery the system automatically retrieves related augmentation information services and presents in the client user interface 2330.

The user interface described may be used with a variety of computer systems for purposes of accessing information services. Information services related to multimodal information provided by the system may include information and optionally features and instructions for the handling of information. As used herein, the term "information associated with an information service" may refer to the information included in an information service.

Information services may enable the delivery, creation, deletion, modification, classification, storing, sharing, communication, and interassociation of information. Further, information services may also enable the delivery, creation, deletion, modification, classification, storing, sharing, communication, and interassociation of other information services. Furthermore, information services may also enable the control of other physical and information systems in physical or computer environments.

As used herein, the term "physical systems" may refer to objects, systems, and mechanisms that may have a material or tangible physical form. Examples of physical systems include a television, a robot or a garage door opener. As used herein, the term "information systems" may refer to processes, systems, and mechanisms that process information. Examples of information systems include a software algorithm or a knowledge base. Furthermore, information services may enable the execution of financial transactions. Information services may contain one or more data/media types such as text, audio, still images and video.

Further, information services may include instructions for one or more processes, such as delivery of information, management of information, sharing of information, communication of information, acquisition of user and sensor inputs, processing of user and sensor inputs and control of other physical and information systems.

Furthermore, information services may include instructions for one or more processes, such as delivery of information services, management of information services, sharing of information services and communication of information services. Information services may be provided from sources internal to the system or external to the system.

Sources external to the system may include the Internet. Examples of Internet services include World Wide Web, e-mail and the like. An exemplary information service may comprise of a World Wide Web page that includes both information and instructions for presenting the information. Examples of more complex information services include Web search, e-commerce, comparison shopping, streaming video, computer games, podcasts, and the like. In another example, an information service may provide a modified version of the information or content from a World Wide Web resource or URL.

In some embodiments, delivery of information services may include providing the spatial and temporal formatting and layout information for the information services. Similarly, in some other embodiments, delivery of information associated with information services may include providing the spatial and temporal formatting and layout information for the information associated with information services.

In some embodiments, information services may include controls for generating various commands and activating functionality provided by the system. In some embodiments, information services may be provided in conjunction with visual imagery in the form of overlays or embedded information services for an "augmented reality" experience.

In other embodiments, information services may be presented independent of the visual imagery. In some embodiments, information services are provided upon request. In other embodiments, information services are provided upon the occurrence of predefined events or upon the meeting of predefined criteria.

In some embodiments, information services include features that enable the creation, deletion, modification, classification, storage and sharing of information and other information services. In some embodiments, access to information, information services and their classifications may be restricted to select users using the authentication, authorization, and accounting (AAA), user groups, and digital rights management (DRM) features included in information services.

In some embodiments, the classifications of information services and information associated with information services may be managed using a folder hierarchy. In some embodiments, information and information services may be communicated to recipients (e.g., other users of system 2400 and other third party entities external to system 2400) through communication mechanisms (e.g., SMS, e-mail, instant messaging, voice calls, video calls, and the like). A voice call initiated with visual imagery as input is an example of an information service incorporating features for communicating information. In some embodiments, interassociations may be established between information services through hyperlinks embedded in information services.

In other embodiments, interassociations may be established between information associated with information services using hyperlinks embedded in information services. Information services may be used by users or other physical and information systems. For example, an information service may switch a television to a specific channel. In some embodiments, instructions included in information services may activate various user interface controls and functionality integrated into the client.

In other embodiments, instructions included in information services may add new controls and functionality to the client or modify existing controls and functionality on the client. In some other embodiments, information services may also be synthesized from a plurality of other information services.

Information services are associated with multimodal information through interpretation of context constituents associated with the multimodal information. Context constituents associated with multimodal information may include: 1) embedded elements derived from the multimodal information, 2) metadata and user inputs associated with the multimodal information, and 3) relevant knowledge derived from knowledge bases.

System Architecture

Figure 14:
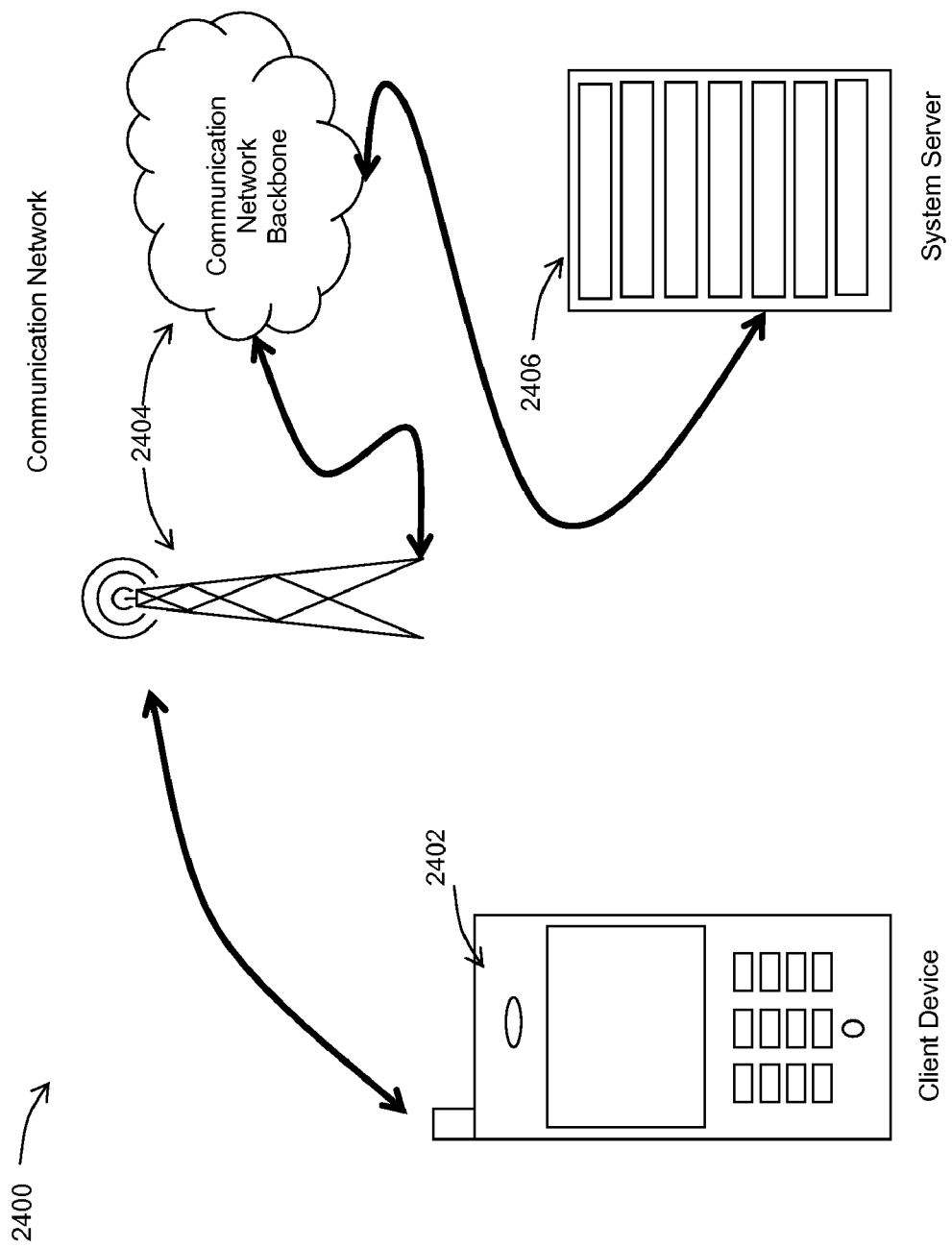
FIG. 14 illustrates an exemplary system, in accordance with an embodiment.

FIG. 14 illustrates an exemplary system, in accordance with an embodiment. Here, system 2400 includes client device 2402, communication network 2004, and system server 2406.

Figure 15:
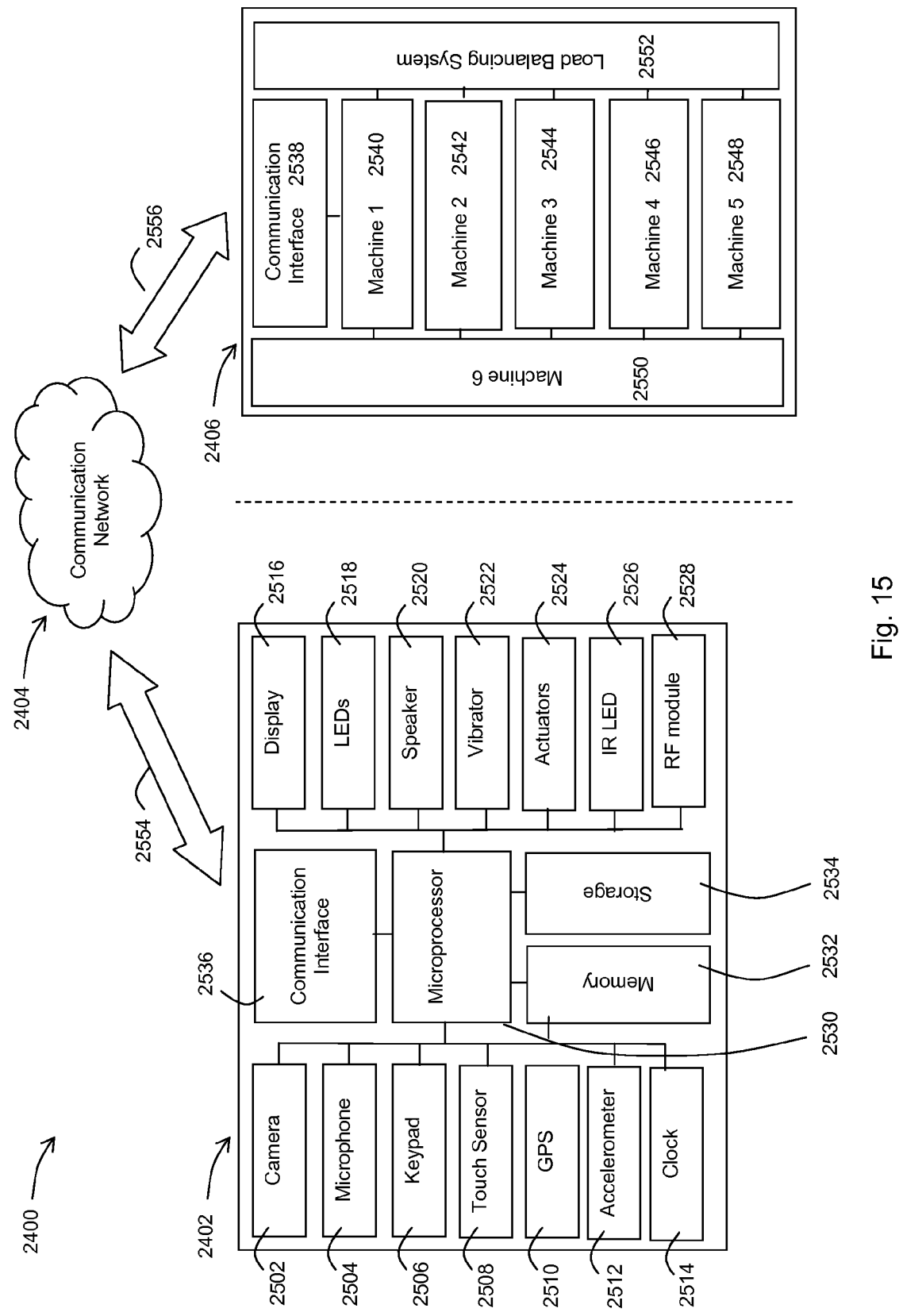
FIG. 15 illustrates an alternate view of an exemplary system, in accordance with an embodiment.

FIG. 15 illustrates an alternative view of an exemplary system, in accordance with an embodiment. System 2400 illustrates the hardware components of the exemplary embodiment (e.g., client device 2402, communication network 2404, and system server 2406). Here, client device 2402 communicates with system server 2406 over communication network 2404. In some embodiments, client device 2402 may include camera 2502, microphone 2504, keypad 2506, touch sensor 2508, global positioning system (GPS) module 2510, accelerometer 2512, clock 2514, display 2516, visual indicators (e.g., LEDs) and/or a projective display (e.g., laser projection display systems) 2518, speaker 2520, vibrator 2525, actuators 2524, IR LED 2526, radio frequency (RF) module (i.e., for RF sensing and transmission) 2528, microprocessor 2530, memory 2532, storage 2534, and communication interface 2536.

System server 2406 may include communication interface 2538, machines 2540-2550, and load balancing subsystem 2552. Data flows 2554-2556 are transferred between client device 2402 and system server 2406 through communication network 2404.

Examples of client device 2402 may include communication equipment (e.g., cellular telephones), business productivity gadgets (e.g., personal digital assistant (PDA)), consumer electronics devices (e.g., digital camera and portable game devices or television remote control) and personal computers. In some embodiments, components, features, and functionality of client device 2402 may be integrated into a single physical object or device such as a camera phone.

In some embodiments, client device 2402 is a single physical device (e.g., a wireless camera phone). In other embodiments, client device 2402 may be implemented in a distributed configuration across multiple physical devices. In such embodiments, the components of client device 2402 described above may be integrated with other physical devices that are not part of client device 2402.

Examples of physical devices into which components of client device 2402 may be integrated include cellular phone, digital camera, Point-of-Sale (POS) terminal, webcam, personal computer keyboard, television set, computer monitor, and the like. Components (i.e., physical, logical, and virtual components and processes) of client device 2402 distributed across multiple physical devices are configured to use wired or wireless communication connections among them to work in a unified manner. In some embodiments, client device 2402 may be implemented with a personal mobile gateway for connection to a wireless Wide Area Network (WAN), a digital camera for capturing visual imagery and a cellular phone for control and display of information services with these components communicating with each other over a wireless personal area network such as Bluetooth™ or a local area network technology such as Wi-Fi (i.e., IEEE 802.11x). In some other embodiments, components of client device 2402 are integrated into a television remote control or cellular phone while a television is used as the visual output device.

In still other embodiments, a collection of wearable computing components, sensors and output devices (e.g., display equipped eye glasses, virtual retina displays, sensor equipped gloves, and the like) communicating with each other and to a long distance radio communication transceiver over a wireless communication network constitutes client device 2402. In other embodiments, projective display 2518 projects the visual information to be presented on to the environment and surrounding objects using light sources (e.g., lasers), instead of displaying it on display panel 2516 integrated into the client device.

While the visual components of the user interface are presented through display 2516, audio components of the user interface may be presented through speaker 2520 integrated into client device 2402 while the integrated camera 2502, microphone 2504 and keypad 2506 act as the input sources for visual, audio and textual information. The client logic by itself may be implemented as software executing on microprocessor 2530 or using equivalent firmware or hardware.

Communication network 2404 may be implemented using a wired network technology such as Ethernet, cable television network (DOCSIS), phone network (xDSL) or fiber optic cables. Communication network 2404 may also use wireless network technologies such as cable replacement technologies such as wireless IEEE 1394, personal area network technologies such as Bluetooth™ Local Area Network (LAN) technologies such as IEEE 802.11x, wide area network (WAN) technologies such as GSM, GPRS, EDGE, UMTS, CDMA One, CDMA 1x, CDMA 1x EV-DO, CDMA 1x EV-DV, IEEE 802.x networks, or their evolutions.

Communication network 2404 may also be implemented as an aggregation of one or more wired or wireless network technologies. In some embodiments, communication network 2404 may be realized as a computer bus (e.g., PCI) or cable connection (e.g., Firewire).

Figure 16:
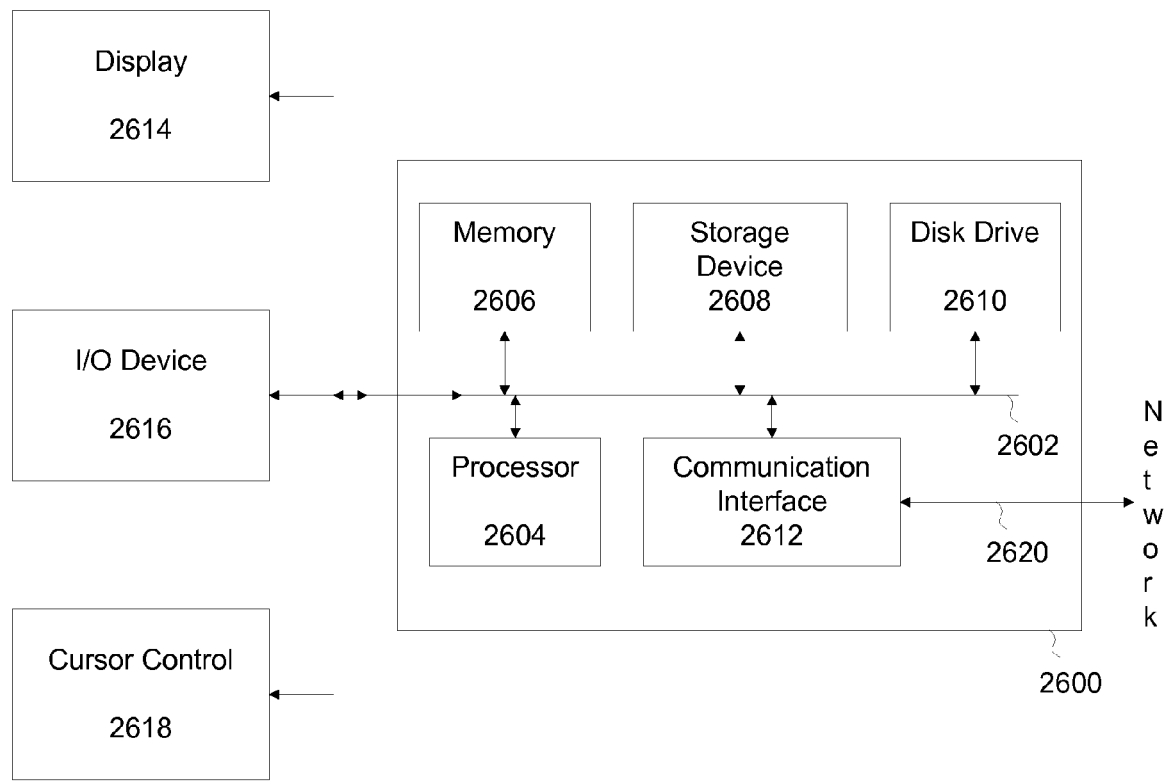
FIG. 16 is a block diagram illustrating an exemplary computer system of suitable for providing information services related to multimodal information, in accordance with an embodiment.

FIG. 16 is a block diagram illustrating an exemplary computer system suitable for providing information services relevant to multimodal information. In some embodiments, computer system 2600 may be used to implement computer programs, applications, methods, or other software to perform the above-described techniques for providing information services relevant to multimodal information such as those described above.

Computer system 2600 includes a bus 2602 or other communication mechanism for communicating information, which interconnects subsystems and devices, such as processor 2604, system memory 2606 (e.g., RAM), storage device 2608 (e.g., ROM), disk drive 2610 (e.g., magnetic or optical), communication interface 2612 (e.g., modem or Ethernet card), display 2614 (e.g., CRT or LCD), input device 2616 (e.g., keyboard), and cursor control 2618 (e.g., mouse or trackball).

According to some embodiments, computer system 2600 performs specific operations by processor 2604 executing one or more sequences of one or more instructions stored in system memory 2606. Such instructions may be read into system memory 2606 from another computer readable medium, such as static storage device 2608 or disk drive 2610. In some embodiments, hard-wired circuitry may be used in place of or in combination with software instructions to implement the system.

The term "computer readable medium" refers to any medium that participates in providing instructions to processor 2604 for execution. Such a medium may take many forms, including but not limited to, nonvolatile media, volatile media, and transmission media. Nonvolatile media includes, for example, optical or magnetic disks, such as disk drive 2610. Volatile media includes dynamic memory, such as system memory 2606. Transmission media includes coaxial cables, copper wire, and fiber optics, including wires that comprise bus 2602. Transmission media may also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read.

In some embodiments, execution of the sequences of instructions to practice the system is performed by a single computer system 2600. According to some embodiments, two or more computer systems 2600 coupled by communication link 2620 (e.g., LAN, PSTN, or wireless network) may perform the sequence of instructions to practice the system in coordination with one another. Computer system 2600 may transmit and receive messages, data, and instructions, including program, i.e., application code, through communication link 2620 and communication interface 2612. Received program code may be executed by processor 2604 as it is received, and/or stored in disk drive 2610, or other nonvolatile storage for later execution.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A graphical user interface displayed on a portable wireless electronic device for providing context-based information services by interpreting visual imagery on the portable wireless electronic device comprising:
    a display displaying a first tab comprising a first tab pane comprising a video display region, a first plurality of video controls below the video display region, and a first text box having a first area size, wherein the first text box overlays the video display region, the video display region comprises a video, and the first text box comprises at least a portion of an augmentation information associated with the video, wherein the augmentation information is generated by:
    a user selecting text displayed in the video,
    recognizing the selected text in the video,
    generating a context based on the selected text, and
    using the generated context in a search for relevant augmentation information to present in the first text box; and
    a second tab comprising a second tab pane comprising a second text box having a second area size, greater than the first area size, wherein the second text box comprises the augmentation information displayed in the first text box, and when the second tab is selected, the second tab pane overlays the first tab pane, wherein the augmentation displayed in the first text box is read-only and the augmentation displayed in the second text box can be edited by the user.

2. The graphical user interface of claim 1 wherein the video display region comprises a plurality of horizontal reference lines overlaying the video.

3. The graphical user interface of claim 1 wherein the video comprises visual imagery captured live.

4. The graphical user interface of claim 1 wherein the video comprises a prerecorded visual imagery.

5. The graphical user interface of claim 1 wherein the first plurality of video controls comprises a play button, a stop button, a zoom button, and a record button.

6. The graphical user interface of claim 1 wherein the first tab comprises a first tab label, the second tab comprises a second tab label, and the first and second tab labels are nearer to a top edge of the display of the portable wireless electronic device than a bottom edge of the display.

7. The graphical user interface of claim 1 wherein the portable wireless electronic device is a camera phone.

8. The graphical user interface of claim 1 wherein the augmentation information comprises links to on-line information.

9. The graphical user interface of claim 1 wherein the first text box is an editable text box.

10. The graphical user interface of claim 1 wherein when the first tab is selected, the first tab pane overlays the second tab pane.

11. The graphical user interface of claim 1 wherein the annotation is vocalized using an audio player of the portable wireless electronic device.

12. The graphical user interface of claim 1 wherein the first text box is highlighted by a dashed line surrounding the first text box.

13. The graphical user interface of claim 1 wherein the first tab further comprises a second plurality of video controls comprising a marking control, the marking control being arranged to mark or highlight portions of the visual imagery.

14. The graphical user interface of claim 1 wherein the augmentation information is automatically generated without additional user input.

15. The graphical user interface of claim 1 wherein the augmentation information is generated upon explicit request by a user.

16. The graphical user interface of claim 1 further comprising an interface, the interface being arranged to record audio information through a microphone integrated into the wireless electronic device.

* * * * *